(12) United States Patent
Ramamurthy

(10) Patent No.: US 10,725,441 B2
(45) Date of Patent: Jul. 28, 2020

(54) ENERGY MANAGEMENT WITH MULTIPLE PRESSURIZED STORAGE ELEMENTS

(71) Applicant: Energy Harbors Corporation, Inc., Saratoga, CA (US)

(72) Inventor: Shankar Ramamurthy, Saratoga, CA (US)

(73) Assignee: Energy Harbors Corporation, Inc., Saratoga, CA (US)

( * ) Notice: Subject to any disclaimer, the term of this patent is extended or adjusted under 35 U.S.C. 154(b) by 76 days.

(21) Appl. No.: 16/118,886

(22) Filed: Aug. 31, 2018

(65) Prior Publication Data

US 2019/0064757 A1    Feb. 28, 2019

Related U.S. Application Data

(60) Provisional application No. 62/552,747, filed on Aug. 31, 2017, provisional application No. 62/654,718, filed on Apr. 9, 2018, provisional application No. 62/654,859, filed on Apr. 9, 2018, provisional application No. 62/679,051, filed on Jun. 1, 2018.

(51) Int. Cl.
| | |
|---|---|
| *G05B 13/04* | (2006.01) |
| *H02J 3/00* | (2006.01) |
| *H02J 15/00* | (2006.01) |
| *G05B 13/02* | (2006.01) |
| *G06Q 10/06* | (2012.01) |
| *G06Q 50/06* | (2012.01) |

(52) U.S. Cl.
CPC ......... *G05B 13/048* (2013.01); *G05B 13/028* (2013.01); *G06Q 10/06314* (2013.01); *G06Q 50/06* (2013.01); *H02J 3/00* (2013.01); *H02J 15/003* (2013.01); *H02J 15/006* (2013.01); *G05B 2219/2639* (2013.01); *H02J 3/003* (2020.01); *H02J 2203/20* (2020.01)

(58) Field of Classification Search
None
See application file for complete search history.

(56) References Cited

U.S. PATENT DOCUMENTS

| | | | |
|---|---|---|---|
| 8,805,550 B2 * | 8/2014 | Chemel | H05B 37/029 315/51 |
| 9,540,957 B2 | 1/2017 | Shinnar et al. | |
| 9,562,183 B2 | 2/2017 | Hidalgo et al. | |
| 9,568,235 B2 | 2/2017 | Dobbs | |
| 9,631,846 B2 | 4/2017 | Chen et al. | |
| 9,651,030 B2 | 5/2017 | Kim et al. | |
| 9,664,140 B2 | 5/2017 | Kalika | |

(Continued)

*Primary Examiner* — Ramesh B Patel
(74) *Attorney, Agent, or Firm* — Adams Intellex, PLC

(57) ABSTRACT

Disclosed techniques include energy management with multiple pressurized storage elements. Energy is obtained from one or more energy sources. Energy requirements are modeled over a first time period and a second time period. A first subset of the energy that was obtained is allocated for storage in a first energy store based on the modeling. A second subset of the energy that was obtained is allocated for storage in a second energy store based on the modeling, where the second energy store comprises a pressurized storage element. Energy is routed to the first energy store from the second energy store based on the modeling. Recovering energy further includes using the energy routed to the first energy store or the second energy store, based on the modeling.

26 Claims, 13 Drawing Sheets

(56) References Cited

U.S. PATENT DOCUMENTS

| | | | |
|---|---|---|---|
| 10,059,215 B1* | 8/2018 | Haberman | G05D 23/1904 |
| 2008/0071705 A1* | 3/2008 | Enis | F28D 20/00 |
| | | | 705/412 |
| 2008/0172279 A1* | 7/2008 | Enis | G06Q 10/06315 |
| | | | 705/7.25 |
| 2010/0308765 A1* | 12/2010 | Moore | H02J 7/0013 |
| | | | 320/103 |
| 2011/0272117 A1* | 11/2011 | Hamstra | F24D 12/02 |
| | | | 165/45 |
| 2012/0150679 A1* | 6/2012 | Lazaris | G06Q 30/0605 |
| | | | 705/26.2 |
| 2012/0296482 A1* | 11/2012 | Steven | G06Q 50/06 |
| | | | 700/291 |
| 2013/0336721 A1* | 12/2013 | McBride | E21D 11/00 |
| | | | 405/55 |
| 2014/0039709 A1* | 2/2014 | Steven | G06Q 10/06 |
| | | | 700/291 |
| 2014/0039710 A1* | 2/2014 | Carter | G06Q 10/06 |
| | | | 700/291 |
| 2014/0129042 A1* | 5/2014 | Miner | G05B 13/02 |
| | | | 700/296 |
| 2014/0277788 A1* | 9/2014 | Forbes, Jr. | H04L 67/10 |
| | | | 700/286 |
| 2016/0363948 A1* | 12/2016 | Steven | G05F 1/66 |
| 2017/0038157 A1 | 2/2017 | O'Donnell et al. | |
| 2017/0044414 A1 | 2/2017 | Sutterlin et al. | |
| 2017/0067667 A1 | 3/2017 | Choi | |
| 2017/0082060 A1 | 3/2017 | Kalika | |
| 2017/0082380 A1 | 3/2017 | Gauche et al. | |
| 2017/0159495 A1 | 6/2017 | Laughlin et al. | |

\* cited by examiner

| | SHORT-TERM STORAGE | ENERGY GENERATION | LONG-TERM STORAGE | OUTSIDE OF MICROGRID |
|---|---|---|---|---|
| ELECTRICAL | BATTERY | GENERATOR - MOTOR | UNDERWATER AIR | TRADITIONAL POWER GRID |
| STEAM | ABOVEGROUND STEAM | HEAT ENGINE STEAM | UNDERGROUND STEAM | RENEWABLE ENERGY GRID |
| ICE / SOLID N2 | ABOVEGROUND SOLID N2 | HEAT ENGINE ICE / N2 | UNDERGROUND ICE / N2 | SEASONAL ENERGY GRID |

*FIG. 8*

ENERGY MANAGEMENT WITH MULTIPLE PRESSURIZED STORAGE ELEMENTS

RELATED APPLICATIONS

This application claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to energy management and more particularly to energy management with multiple pressurized storage elements.

BACKGROUND

Energy producers, government agencies, and responsible consumers strive to initiate, enforce, and practice energy conservation measures, respectively. With respect to consumers, turning off lights when leaving a room, lowering the thermostat in winter or increasing the thermostat in summer, or purchasing energy-efficient appliances, are all popular approaches to energy conservation. However, despite concerted conservation efforts, the demand for energy of all types continues to increase beyond what conservation alone has been able to achieve. As towns, cities, states, and countries grow, the demand for energy of all kinds has increased, resulting in what many analysts identify as an energy crisis. The energy demand increases have many root causes. Overconsumption of energy has imposed strains on natural resources ranging from fossil fuels to renewables such as wood chips, resulting in fuel shortages and increased environmental pollution. Population growth and the desire to provide electricity to previously underserved or unserved regions put further strains on energy sources by increasing the numbers of energy consumers who can now perform daily tasks such as washing, cooking, entertaining, illuminating, and heating and cooling of their houses and apartments. In addition to domestic use, the energy increases also result from expanded economic activities such as manufacturing, transportation, and retail, to name but a few.

Energy distribution problems are frequently identified as a hindrance to solving the energy crisis. Insufficient energy distribution infrastructure and aging energy generation equipment are unable to keep pace with the increased energy demands. Renewable energy options remain largely unexplored or underdeveloped. There is strong and vociferous resistance by adjacent landowners and others to siting of windmills, solar farms, or wood burning plants. Even when plans can be made to construct such energy producing facilities, energy distribution is stymied by the poor distribution infrastructure. Commissioning of new energy generation facilities remains a seemingly unobtainable objective. Legal wrangling, construction delays, pollution mitigation requirements, overwhelming costs, or even war, have prevented, halted, or delayed new energy generation facilities coming online. Energy wastage is also a major concern. Aging appliances or manufacturing equipment, incandescent light bulbs, and poor building insulation and air sealing, all waste energy in comparison to their modern counterparts.

To meet the increases in energy demands, national, state, and local public officials, plus city and regional planners, have been faced with deciding among three broader choices: to increase energy production by building new power plants, to reduce energy demand through energy conservation, or to combine both of these strategies. More recently, another emerging option is to source energy production based on renewable energy sources such as solar, wind, geothermal, wave action, and so on. One major limitation of many renewable energy sources is that the sources do not produce consistent amounts of energy 24 hours per day. Solar energy, for one, only produces energy in the presence of light, and produces varying amounts of energy depending on the intensity of the light hitting photovoltaic panels. Energy sources and demands must be balanced so that clean, reliable, and consistent energy is available to all consumers throughout the country.

SUMMARY

Energy management is based on the premise that energy is produced in sufficient amounts to at least meet the demands for energy. The demands for the energy include manufacturing and production, transportation, lighting, heating and cooling, operating hospitals and schools, running households, and so on. Further to the immediate uses of the energy, excess energy can be stored. The storing of the excess energy can include short-term storage to meet peaks in demand or short disruptions of energy sources, and it can also include long-term storage. The long-term storage of energy is of increasing interest to energy producers and consumers alike. The long-term storage can capture and store for later use excess energy produced using conventional techniques. Long-term storage can also capture and store energy produced by less reliable or intermittent energy sources including renewable energy sources such as solar or wind sources. The storage of the excess energy or renewable energy as it is produced enables access to energy when the renewable energy is not being produced. Long-term energy storage also has cost advantages. Storing energy when the production costs of the energy are low then accessing the stored energy when production costs of energy are high can balance out production costs, reduce overall energy production costs, and etc.

Energy production and energy consumption both can vary over a given period of time such as a day, week, month, season, year, and so on. The imbalance between energy production and energy consumption can be due to differing energy demands throughout a period of time, changeable energy production capabilities due to the presence or absence of a renewable resource used to generate the energy, and so on. To help correct the energy production/consumption imbalance, energy can be stored at one time and used at another time in the future. By collecting and storing energy when a renewable resource is available, when energy production is relatively inexpensive, etc., the stored energy can be used to augment the amount of energy that is available during periods of increased or unmet energy need. The generating, storing, and extracting stored energy can be applied to low-level energy demand scenarios, such as the energy needs of a household or small farm, to larger scale energy needs such as manufacturing, and to the largest scale energy needs of an energy distribution grid.

Disclosed techniques address energy management with multiple pressurized storage elements. Energy is obtained from one or more energy sources. The energy sources can include commercially generated energy, locally generated energy, renewable energy, and so on. Energy requirements are modeled over a first time period and a second time period. The first time period and the second time period can include a short-term basis and a long-term basis. A first subset of the energy obtained is allocated for storage in a first energy store based on the modeling. A second subset of the energy obtained is allocated for storage in a second energy store based on the modeling, where a second energy store comprises a pressurized storage element. An energy store can include compressed air, liquid nitrogen, solid nitrogen, ice, and so on. An energy store can enable storage of electrical energy in a battery, electrical energy in a capacitor, electrical energy in an inductor, thermal energy in above ground steam, potential kinetic energy in underwater compressed air, thermal and phase change energy in underground steam, thermal and phase change energy in above ground solid nitrogen, or thermal and phase change energy in underground liquid nitrogen and ice. Energy is routed to the first energy store from the second energy store based on the modeling.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 8 is a table illustrating example core energy modules.

DETAILED DESCRIPTION

Figure 1:
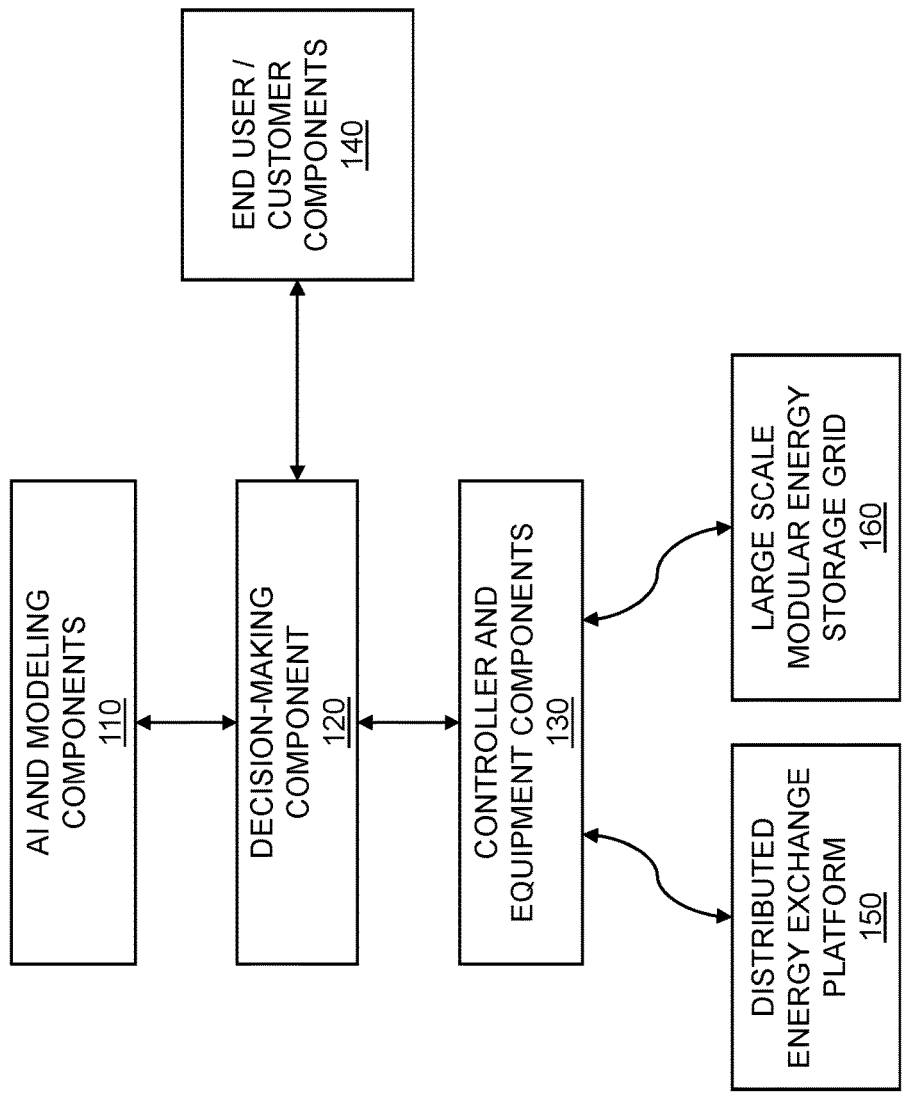
FIG. 1 is a system diagram for energy management with multiple storage elements.

This disclosure provides techniques for energy management with multiple pressurized storage elements. Managing the sourcing, allocating, storing, routing, recovering, and extracting of energy are highly challenging tasks. Energy management can be profoundly influenced by many factors including the weather or other natural events; seasonal factors such as demands for cooling in warm months and heating in cold months; varying energy demand based on time of day, day of week, or day of month; variable energy pricing schemes; and so on. Energy management can be further complicated by changing customer energy demands, requirements of service level agreements (SLA), government regulation, etc. Despite the growing use of renewable energy resources such as solar, wind, hydro, wave action, tidal, and the like, two unavoidable caveats remain: the amount of energy produced by a given renewable energy source varies significantly, and the renewable energy source is not always available. For example, solar energy is only available when sunlight is present, wind energy only when the wind is blowing, wave action energy only when there are waves present, and so on.

Energy that is available during intermittent periods of time can be stored when the energy is available, then later extracted when the energy is needed. A similar strategy can be used based on energy pricing, where energy is stored when inexpensive to produce, then later extracted when the cost of energy production is high. The stored energy can be used in combination with other energy sources such as grid power or backup power to meet current or predicted energy demands. Storage can include a period of time, where the period of time can be a short-term basis or a long-term basis. Here, a short-term basis can include an integer number of seconds, minutes, hours, or days, wherein the integer number of seconds, minutes, hours, or days comprises a length of time substantially less than one week. A long-term basis can include an integer number of weeks, months, seasons, or years, wherein the integer number of weeks, months, seasons, or years comprises a length of time substantially more than one day. Since energy losses are incurred by converting energy from one energy type to another energy type, storing energy, extracting energy, routing energy, etc., minimizing the energy losses is critical. Electrical energy storage has long been possible using techniques based on mature battery technologies or more recently on capacitors, but the costs of battery-based or capacitor-based systems are prohibitive and problematic with respect to long-term storage purposes. Usage of batteries on a large scale, especially for multi-month storage for example, is simply not a viable solution.

In disclosed techniques, energy management is based on the use of multiple pressurized storage elements. Energy is obtained from one or more energy sources. The energy sources can include stored energy sources from energy stores, where the energy stores can include compressed air in an underwater bladder, steam in an underwater bladder, underground liquid nitrogen, underground solid nitrogen, and ice storage. Energy requirements are modeled over a first time period and a second time period. The models can be uploaded by a user, downloaded from the Internet, obtained from a library, etc. The first time period can be a short-term basis, where the short-term basis can be an integer number of seconds, minutes, hours, or days, and the integer number of seconds, minutes, hours, or days comprises a length of time substantially less than one week. The second time period can be a long-term basis, where the long-term basis can be an integer number of weeks, months, seasons, or years, and the integer number of weeks, months, seasons, or years comprises a length of time substantially more than one day. A first subset of the energy that was obtained is allocated for storage in a first energy store based on the modeling. A second subset of the energy that was obtained is allocated for storage in a second energy store based on the modeling, where the second energy store comprises a pressurized storage element. The first store and the second store can include compressed air, steam, liquid nitrogen, solid nitrogen, ice, etc. Energy is routed to the first energy store from the second energy store based on the modeling. Energy can be recovered using the energy routed to the first energy store or the second energy store, based on the modeling. The routing can include transforming the first subset of energy into a second storable energy type, transforming the second subset of energy into a second storable energy type, and so on.

FIG. 1 is a system diagram for energy management with multiple pressurized storage elements. Energy storage, allocation, routing, recovery, and extraction can be based on energy management with multiple pressurized storage elements. Energy is obtained from one or more energy sources. Energy requirements are modeled over a first time period and a second time period, where the first time period can be a short-term basis, and the second time period can be a long-term basis. A first subset of the energy that was obtained is allocated for storage in a first energy store based on the modeling. A second subset of the energy that was obtained is allocated for storage in a second energy store based on the modeling, where the second energy store comprises a pressurized storage element. Energy is routed to the first energy store from the second energy store based on the modeling.

A system 100 is shown for energy management with multiple pressurized storage elements. The pressurized storage elements can include pressurized capsules or chambers, pressurized bladders, pressurized accordion-fold bags, and so on, for storing compressed air or gas, steam, liquid nitrogen, etc. Other storage components can include batteries, inductors, capacitors, etc. The storage elements can store various energy types including electrical energy, thermal energy, kinetic or potential energy, mechanical energy, chemical energy, and so on. The system 100 includes artificial intelligence (AI) and modeling components 110. The AI and modeling components can include weather modeling, energy demand modeling, energy planning, price modeling, and so on. The weather modeling can be based on mathematical models that can use current oceanic and atmospheric data and current weather conditions to predict future weather. Energy demand modeling can be based on weather conditions (e.g. heating, cooling, lighting, etc.), daytime versus nighttime energy needs, seasonal energy requirements, etc. The energy planning model can include parameters such as daily household usage increasing during evening hours, monthly billing, invoicing, payment cycles for commercial ventures, and so on. The price modeling can be based on cost of production of energy and can be used to minimize energy cost.

The system 100 includes a decision-making component 120. The decision-making component can include an energy flow controller, an energy scheduler, system health monitoring and operations metrics, and so on. The energy flow controller can be used to control energy sources such as grid-based energy sources, backup energy sources, renewable energy sources, energy storage sources, and the like. The system health monitoring and operations metrics component can be used to track availability of energy sources, up-time for the sources, operating hours, availability, and so on. The operations metrics can track energy source and demand efficiency, threshold points for maximum and minimum loads, and the like. The energy scheduler can be coupled to the AI and modeling components and can determine when to use any of the available energy sources. The energy scheduler can also be coupled to end user and customer components 140. The end user and customer components can include on-premises equipment such as electrical equipment. The end user and customer systems can include demand management and demand control components.

The system 100 includes controller and equipment components 130. The controller and equipment components can include an energy distribution component and energy components. The energy distribution component can include an energy router, one or more energy sources such as grid, locally generated, and stored energy, an energy controller, and so on. The energy components can include components for short-term energy storage such as batteries and capacitors, generators and transformers, long-term energy storage components such as compressed air, steam, and liquid nitrogen ($N_2$), and so on. The system 100 can be coupled to one or more of a distributed energy exchange platform 150, a large-scale modular energy storage grid 160, and so on. The distributed energy exchange platform 150 can be used to convert energy from one energy type to another energy type, to share energy resources with end users and customers, etc. The large-scale modular energy storage grid 160 can include pressurized storage capsules and bladders, etc.; batteries, capacitors, inductors, and other energy storage components.

Figure 2:
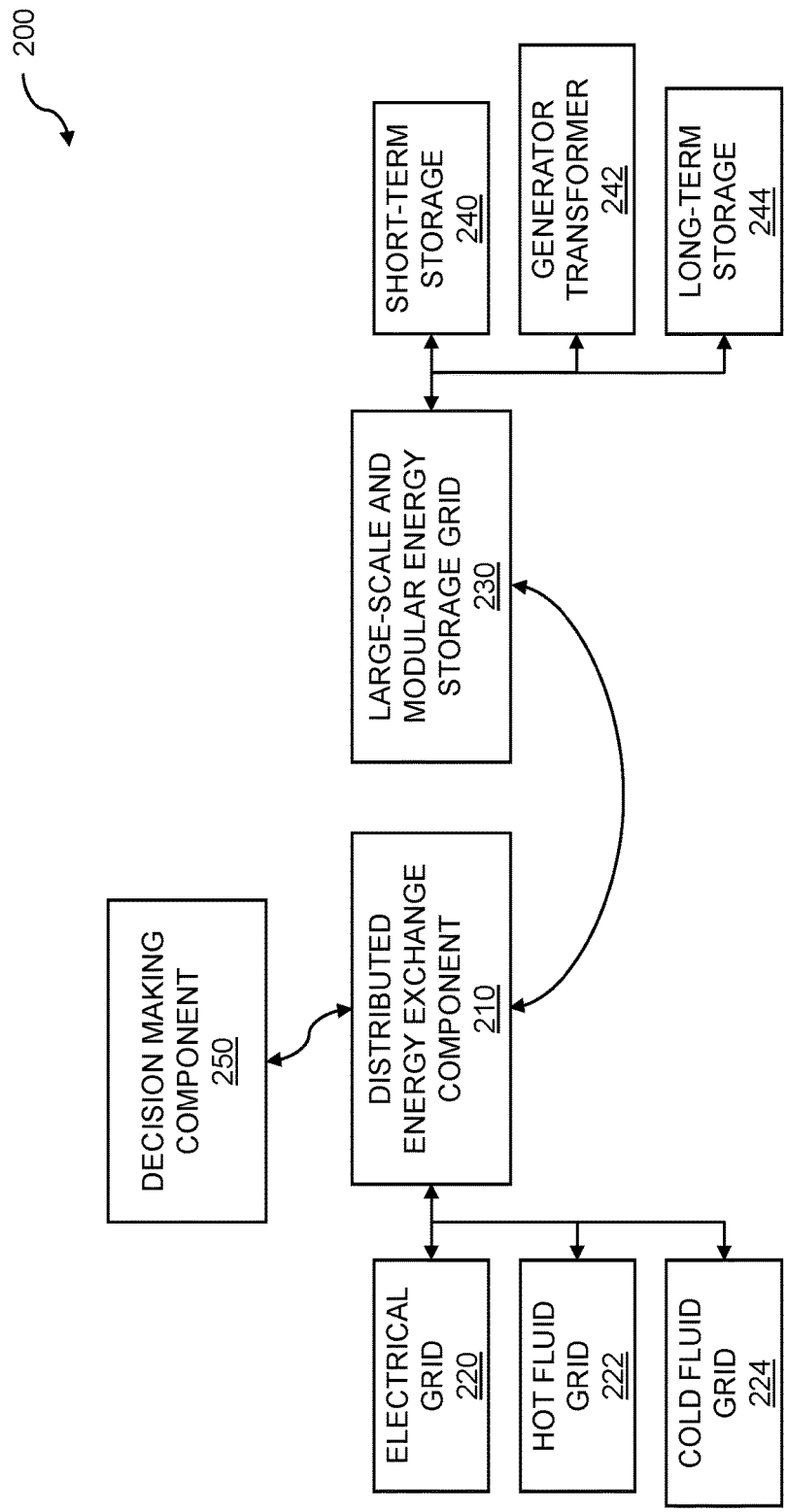
FIG. 2 illustrates an example controller and equipment.

FIG. 2 illustrates an example controller and equipment. The example controller and equipment can be used for energy management with multiple pressurized storage elements. Energy is obtained from one or more energy sources such as grid energy, locally generated energy, microgrid energy, renewable energy, and so on. Energy requirements are modeled over a first time period and a second time period. The modeling can include predicted energy requirements, scheduled energy requirements, backup energy requirements, etc. A first subset of the energy that was obtained is allocated for storage in a first energy store based on the modeling. The energy stored in the first energy store can be allocated on a short-term basis. A second subset of the energy that was obtained is allocated for storage in a second energy store based on the modeling, where the second energy store comprises a pressurized storage element. The energy stored in the second energy store can be allocated on a long-term basis. Energy is routed to the first energy store from the second energy store based on the modeling. Energy is recovered using the energy routed to the first energy store or the second energy store, based on the modeling. The routing further comprises transforming the first subset of energy into a first storable energy type, and transforming the second subset of energy into a second storable energy type.

The example controller and equipment 200 includes a distributed energy exchange component 210. The distributed energy exchange component 210 can be used to interface with various energy grids, to distribute energy to end users, energy customers, and so on. The distributed energy exchange component 210 can exchange energy between and among various energy grids such as an electrical grid 220, a hot fluid grid 222, a cold fluid grid 224, and so on. The distributed energy exchange component can also exchange energy types such as mechanical energy, kinetic energy, potential energy, magnetic energy, chemical energy, and so on. The distributed energy exchange component can be in communication with a large-scale and modular storage grid 230. The large-scale and modular energy storage grid can be used to interface with a variety of energy storage grids and energy conversion components. The large-scale and modular energy storage grid can exchange energy between and among short-term storage 240, generator/transformer sets 242, long-term storage 244, and so on. The short-term storage 240 can include batteries, capacitors, inductors, etc. The generator/transformer sets can convert energy from one energy type to another energy type. Multiple generator/transformer nodes can be used and power and temperatures can be synchronized across the nodes. The long-term storage can include compressed air, steam, liquid nitrogen, solid nitrogen, ice, and the like. The distributed energy exchange component 210 can exchange data, information, instructions, parameters, set-points, and so on with a decision-making component 250. The decision-making component can execute decisions regarding energy exchange based on weather modeling, demand modeling, energy planning, price modeling, and so on.

As discussed energy generation, storage, and distribution are critical elements of the design and implementation of any energy systems, particularly those systems that are based on renewable energy sources. Energy systems such as electrical systems based on renewable sources have been effectively deployed to meet small to medium scale requirements, such as individual houses, farms, small manufactories, and the like. Wider availability of generating equipment and cost or tax incentives have made the installation of such systems more appealing than previously, and the cost of the power generated by the systems is competitive with or less expensive than power that is conventionally generated and distributed via a gird. However, larger scale acceptance of renewable energy has been hindered by several factors, chief among them being high availability of the renewable energy. Renewable energy sources such as solar energy from photovoltaic panels, or wind energy from turbines, are only effective in the presence of sunlight or wind, respectively. To meet the high availability energy demands of certain consumers, energy must be stored when excess energy is available. The stored energy can then be deployed to meet peaks in energy demand, shortfalls due to reduced energy from renewable sources or generating equipment going off-line, and so on.

Energy can be generated using a variety of techniques. Traditional energy sources have included burning fuels such as coal or natural gas to heat water to steam, where the steam is used to spin a turbine. Similarly, nuclear energy has been used to produce steam for spinning the turbine. These energy sources can be used to meet high availability energy demands. Other energy sources have included hydro and geothermal sources, again spinning a turbine using water or steam. Renewable energy sources can provide significant amounts of energy at certain time. Generated energy can be stored when the renewable energy sources are operating effectively, then later extracted when the energy is needed. A decision can then be made about which energy source or sources to use, and how much if any stored energy should be withdrawn from storage. Further energy sourcing and storage decisions can be made based on the cost of energy. Energy can be stored when inexpensive to produce, then later extracted when the cost of energy production is high. As stated previously, stored energy can be used in place of or in combination with other energy sources such as grid power or backup power. The stored energy can be used to meet current or predicted energy demands, such as high heating or cooling demand, scheduled maintenance of equipment, high processing demand in datacenters, etc.

Energy that is generated, whether from conventional sources or renewable sources, can be stored for a period of time. The storage period can be a short-term basis, where a short-term basis can include an integer number of seconds, minutes, hours, or days, etc. The integer number of seconds, minutes, hours, or days can include a length of time substantially less than one week. The storage period can also be on a long-term basis. A long-term basis can include an integer number of weeks, months, seasons, or years. The integer number of weeks, months, seasons, or years can include a length of time substantially more than one day. Storing energy can be based on a cycle, where a cycle includes storing energy and extracting energy. A cycle can be short, such as storing electrical energy from photovoltaic (PV) panels into batteries or capacitors by day, then extracting the electrical energy at night. A cycle can be middling, such as storing thermal energy during warm/hot months for extraction in a later season during cool/cold months. A cycle can be long, such as maintaining strategic energy reserves, perhaps over years. As illustrated, energy storage decisions can be based on a variety of energy storage techniques. Energy storage systems can be based on steam turbine, heat exchanger, compressed air or gas, battery or capacitor, or other techniques. Energy losses are incurred when converting energy from one energy type to another energy type, storing energy, extracting energy, routing energy, etc., thus minimizing energy losses is critical.

Decisions can be made regarding the storage and distribution of energy. The decisions that are made can include choices for sources of energy, types of energy storage, energy distribution, energy priorities, etc. The energy priorities, such as which energy loads will be addressed by how much energy at which times, can be based on service level agreements (SLA), government regulations or mandates, customer demands, and the like. To make the necessary decisions, a detailed evaluation is needed of how much energy is available from generation or storage, and what the energy demands entail. The energy availability, energy storage, and energy demand can be evaluated by measurement. Further, the energy availability, storage, and demand include a time component or state, which captures changes in these three factors. The sources and demands change over time due to generating capacity of grid energy suppliers, renewable energy sources availabilities, commercial energy demand, consumer energy demand, etc. The measurements can include aggregated measurements made over time, where the aggregated measurements are based on measurements made at energy system field deployments. The aggregated measurements are used to set system control parameters for generation, storage, and distribution.

The decisions that are made regarding sourcing, storing, and distributing energy are highly complex. In addition, determining solutions for the decisions is computationally intensive. Some decisions can be based on trends, such as an increase in need for illumination at night, seasonal cooling in hot months, or heating in cold months. Other decisions can be made based on scheduled events such as generating equipment or distribution grid maintenance, or recurring needs such as a datacenter processing payroll every month on $15^{th}$. The decision making can be significantly enhanced by making "smart decisions", where the smart decisions are made by artificial intelligence (AI) or machine learning (ML) systems. The smart decisions can be model based, where the models are determined by performing intensive computations of the energy source and energy load measurements. The models that result from the analysis of the measured data can be adapted by the AI or ML systems based of operating or other parameters. The operating parameters can include maximizing response speed of energy systems, minimizing the numbers of computations required, and so on.

The energy generation, storage, and control models can be determined using a variety of techniques. One modeling technique can include determining a laboratory model, deploying a field model, and learning operating unit models. The laboratory or "lab" model can be based a model that includes a unit component model that is trained by an "expert". The training of the lab model can occur at the time an energy system is deployed, after energy system maintenance or upgrade, etc. A field model can be based on the lab model. The field model can be monitored and can learn based on measurements that are made of an energy system, multiple energy systems, etc. The measurements can be based on cloud computing techniques, where "the cloud" is used to monitor deployed energy system, make measurements, learn, and so on. The monitoring of the field model and the learning by the field model can be undertaken at each field deployment of an energy system. A local or onsite expert energy system operator or expert can perform training tasks on the field model, as the expert supervises the operation of the field model. An operating unit model can be based on a learned field model at a given energy system site, or based on learned field models from a plurality of energy system. The operating unit model can be updated or can learn based on the learned models across the energy system operating sites.

Figure 3:
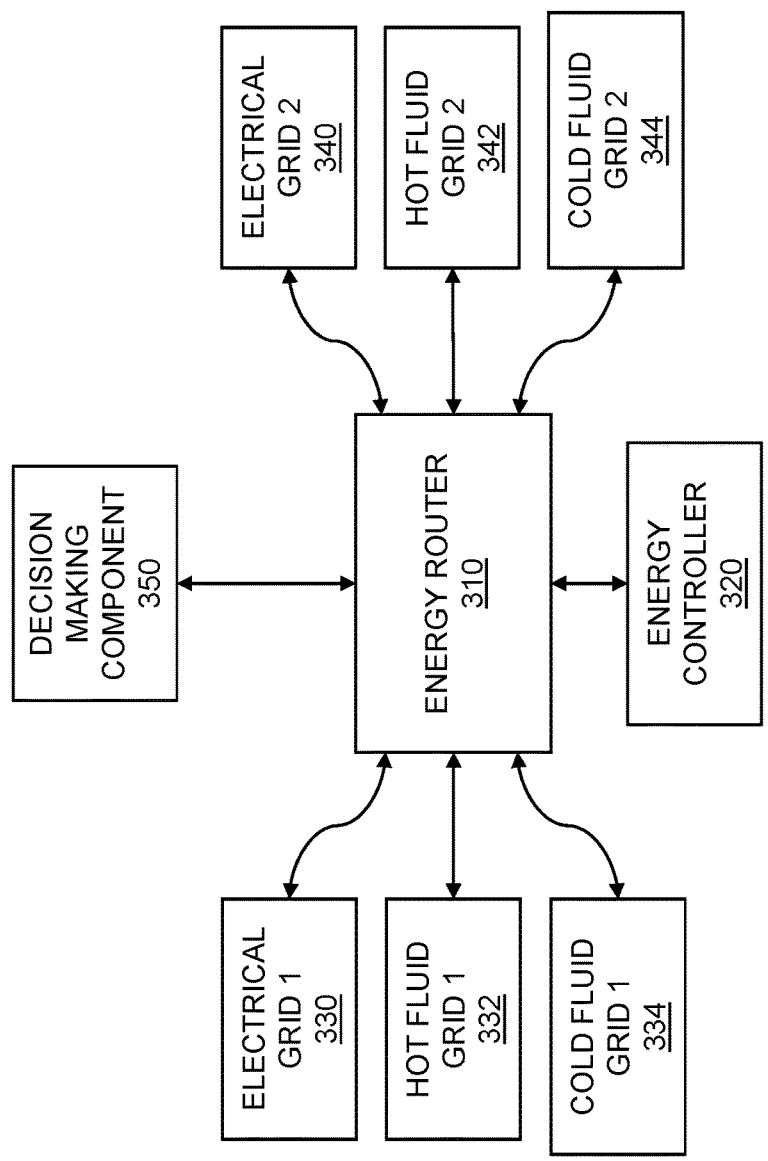
FIG. 3 shows possible energy routings.

FIG. 3 shows possible energy routings. Energy routing between and among energy grids can include energy management with multiple pressurized storage elements. Energy storage and extraction can be based on energy management with multiple pressurized storage elements. Energy is obtained from one or more energy sources. Energy requirements are modeled over a first time period and a second time period, where the first time period can be a short-term basis, and the second time period can be a long-term basis. A first subset of the energy that was obtained is allocated for storage in a first energy store based on the modeling. A second subset of the energy that was obtained is allocated for storage in a second energy store based on the modeling, where the second energy store comprises a pressurized storage element. Energy is routed to the first energy store from the second energy store based on the modeling.

Energy routing 300 can include routing energy from one or more energy grids, short-term basis energy storage grids, or long-term basis energy storage grids, to other energy grids and energy storage components. The energy grid can include a statewide, regional, or national energy grid; a local, community, onsite, or microgrid; etc. An energy router 310 can be controlled by an energy controller 320. The energy router can route energy including various energy types to end users of energy, customer systems such as electrical systems, and so on. The energy controller 320 can provide instructions to the energy controller 310 in support of the energy routing. The energy router can send energy to and receive energy from a first set of energy sources such as electrical grid 1 330, hot fluid grid 1 332, cold fluid grid 1 334, and so on. The energy router can send energy to and receive energy from a second set of energy sources such as electrical grid 2 340, hot fluid grid 2 342, cold fluid grid 2 344, etc. The electrical grids 1 and 2 can include grid energy, locally generated energy, renewable energy, and so on. The hot fluid grids 1 and 2 can include hot water, hot ethylene glycol, etc. The cold fluid grids 1 and 2 can include liquid nitrogen, cold ethylene glycol, and the like. In embodiments, the cold grids can include solid nitrogen, ice, etc. The energy router 310 can be in communication with a decision-making component 350. The decision-making component can include components for weather modeling, demand modeling, energy planning, price modeling, and so on. The decision-making component can decide which energy grids to use for sourcing and storing energy based on climatic conditions, energy demand, predicted energy need, energy cost, and so on. Energy can be stored in various forms and can use the latent heat of fusion in transforming material from one state to another.

Figure 4:
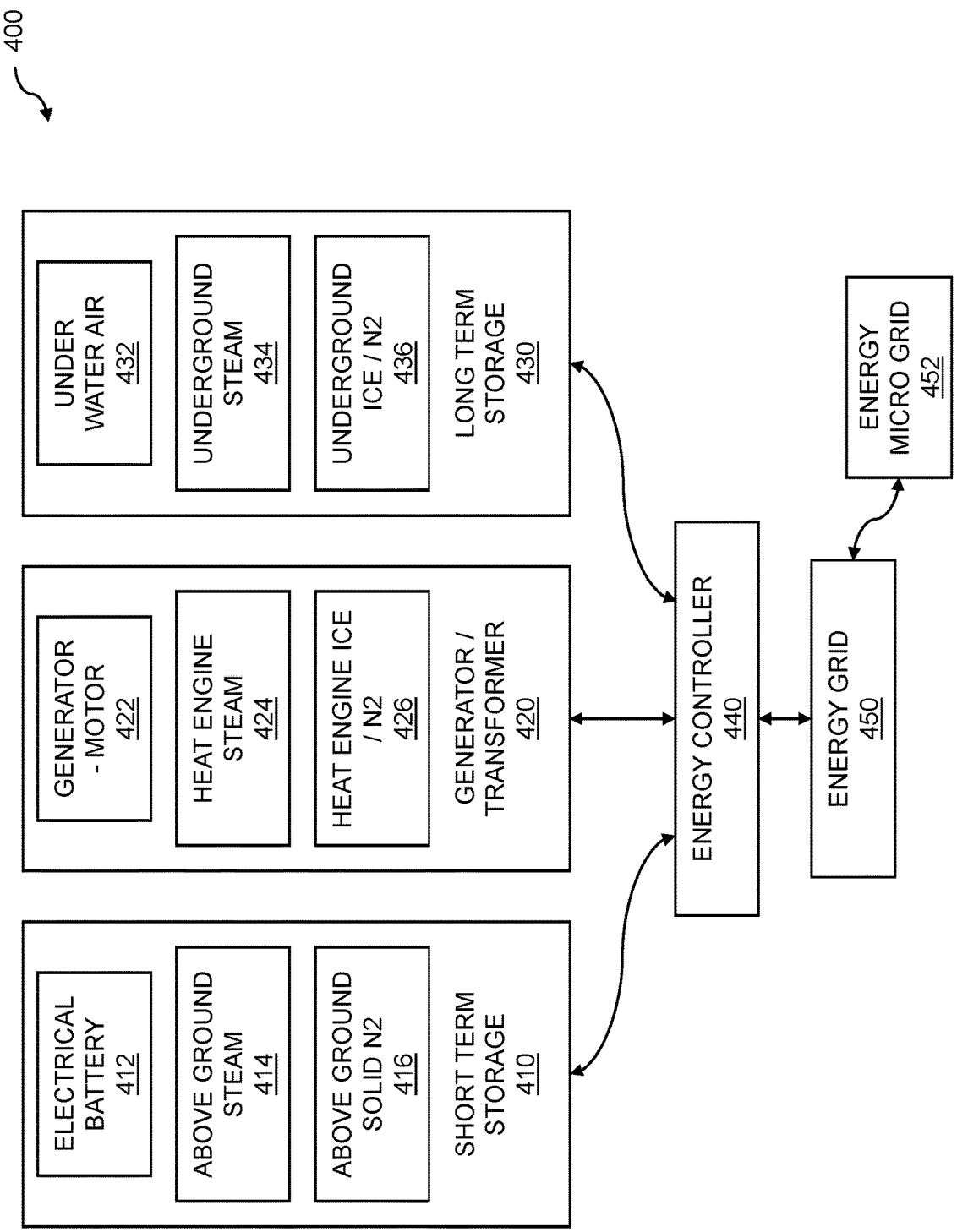
FIG. 4 is an example illustrating energy transformation and storage.

FIG. 4 is an example illustrating energy transformation and storage. Energy can be transformed and stored for energy management with multiple pressurized storage elements. Energy is obtained from one or more energy sources such as grid energy, microgrid energy, locally generated energy, renewable energy, and so on. Energy requirements are modeled over a first time period and a second time period. The modeling can include predicted energy requirements, scheduled energy requirements, seasonal energy requirements, backup energy requirements, etc. A first subset of the energy that was obtained is allocated for storage in a first energy store based on the modeling. The energy stored in the first energy store can be allocated on a short-term basis. A second subset of the energy that was obtained is allocated for storage in a second energy store based on the modeling, where the second energy store comprises a pressurized storage element. The energy stored in the second energy store can be allocated on a long-term basis. Energy is routed to the first energy store from the second energy store based on the modeling. Energy is recovered using the energy routed to the first energy store or the second energy store, based on the modeling. The routing further comprises transforming the first subset of energy into a first storable energy type, and transforming the second subset of energy into a second storable energy type.

Energy can be transformed from one energy type to a storable energy type and stored 400 on a short-term basis or on a long-term basis. In embodiments, the short-term basis can be an integer number of seconds, minutes, hours, or days, wherein the integer number of seconds, minutes, hours, or days comprises a length of time substantially less than one week. In other embodiments, long-term basis is an integer number of weeks, months, seasons, or years, wherein the integer number of weeks, months, seasons, or years comprises a length of time substantially more than one day. The energy transformation and energy storage components can be modular, where the module can include short-term storage, generation and transformation, long-term storage, and so on. The energy transformation and storage components can be scalable so that transformation and storage components can be added to increase transformation and storage capabilities. Energy transformation and storage 400 can include short-term storage 410. Short-term storage can include energy storage in electrical batteries 412, capacitors, inductors, and so on. Short-term storage can include energy storage as above ground steam 414. Short-term storage can include energy storage as solid nitrogen 416.

Energy transformation and storage 400 can include a generator/transformer component. The generator/transformer 420 can generate energy based on the storage medium, convert energy to an appropriate energy type for a storage medium, and so on. The generator/transformer can include a generator/motor 422. A generator/motor can convert electricity into a storable energy type, and can use the storable energy type to generate electricity. The generator/transformer 420 can include a heat engine for steam 424. The heat engine 424 can use an energy source to generate steam, where the steam can be stored above ground, below ground in an expandable bladder, and so on. The generator/transformer 420 can include a heat engine for ice 426. The heat engine for ice 426 can generate ice and solid nitrogen for storage above ground, below ground, underwater, etc. Energy transformation and storage 400 can include long-term storage 430. The long-term storage 430 can include underwater air 432. In embodiments, the underwater air can include compressed air within an underwater bladder. The long-term storage 430 can include underground steam 434. In embodiments, the underground steam can include steam within an underwater bladder. The long-term storage 430 can include underground ice/solid nitrogen ($N_2$) 436. In embodiments, sensible heat can be utilized as temperatures change for various materials where those materials do not change phase. In embodiments, the heat engine can be referred to as a water piston heat engine. The water piston heat engine can facilitate the transfer of power from one state to another state.

Energy transformation and storage 400 can be controlled by an energy controller 440. The energy controller can control the flow of energy, the generation of energy, the transformation of energy, the extraction of energy, etc., from grid energy, short-term basis storage energy, long-term basis storage energy, and so on. The controlling of energy by the energy controller 440 can be based on an application programming interface (API). The API can include an energy planner, where the energy planner can communicate with plug-ins such as a plug-in for weather modeling, a plug-in for energy demand modeling, a plug-in for price modeling, and so on. The energy controller can obtain energy from or route energy to an energy grid 450. The energy grid can include a statewide, regional, or national electrical grid, etc. In embodiments, the energy grid can include an energy microgrid 452. An energy microgrid can include a local energy grid such as a city, town, or community energy grid, an onsite grid, and so on. The energy microgrid can include backup energy sources such as diesel-generator sets, batteries, capacitors, and renewable energy sources such as solar, wind, hydro, or geothermal, etc.

Figure 5:
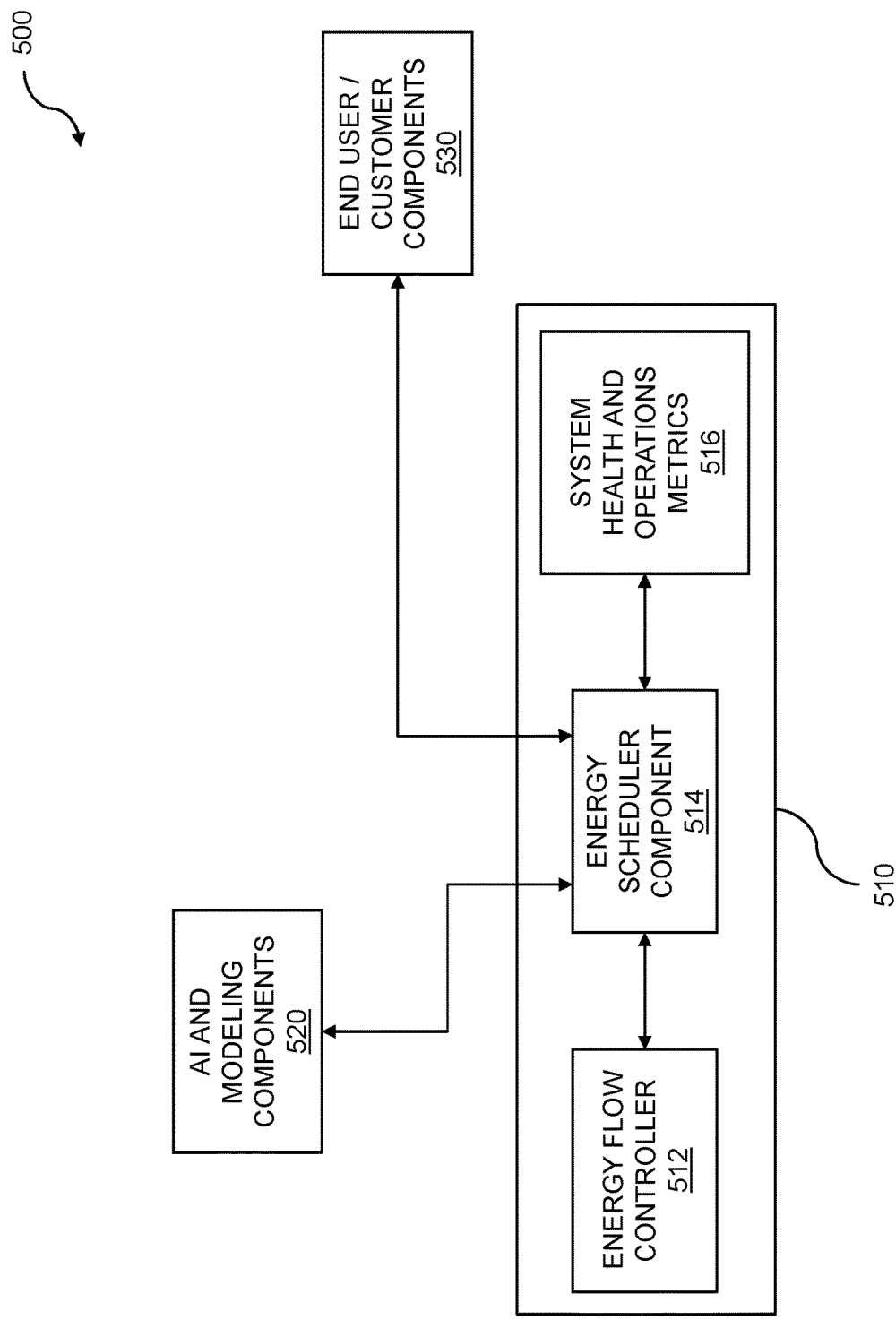
FIG. 5 displays allocating and scheduling components.

FIG. 5 displays allocating and scheduling components. Learning, scheduling, and planning are key factors in energy management. An allocating component 500 can allocate energy for energy management. Energy management can include energy storage and extraction, where the energy management uses multiple pressurized storage elements. Energy is obtained from one or more energy sources. Energy requirements are modeled over a first time period and a second time period, where the first time period can be short-term, and the second time period can be long-term. A first subset of the energy that was obtained is allocated for storage in a first energy store based on the modeling. A second subset of the energy that was obtained is allocated for storage in a second energy store based on the modeling, where the second energy store comprises a pressurized storage element. Energy is routed to the first energy store from the second energy store based on the modeling. Energy is recovered using the energy routed to the first energy store or the second energy store, based on the modeling.

An allocating component 500 can allocate energy from a variety of sources, to storage, to end users and components, and so on. The allocating component can be located on premises (e.g. colocated) with other energy components such as generators and transformers, short-term energy storage elements, long-term energy storage elements, and so on. The allocating component can be located in the cloud. The allocating component 510 can include an energy flow controller 512, an energy scheduler component 514, system health and operations metrics 516, and so on. The energy flow controller 512, energy scheduler component 514, and system health and operations metrics 516 can be part of an application programming interface (API) for energy management. The energy flow controller 512 can control the flow of energy from power sources such as grids, microgrids, local generation sources, renewable sources, and energy storage. The energy flow controller 512 can control the flow of energy to end users, customer components, etc. The energy scheduler component 514 can schedule energy based on weather conditions, energy demands, energy prices, energy plans, etc. The system health and operations metrics 516 can include metrics such as the system's status, maximum draw on available energy, maximum amount of energy sent to short-term and long-term storage, and so on. The analysis can be performed on an end-to-end basis and this effort can be referred to as thread analysis.

The energy scheduler component 514 can receive information from artificial intelligence (AI) and modeling components 520. The AI component can receive information from modeling components such as a weather modeling component, an energy demand modeling component, and a price modeling component, and can make predictions about energy needs. The energy planner can be part of the API. The energy planner can be based on a variety of AI techniques such as a support vector machine (SVM), and convolutional neural network (CNN), a deep neural network (DNN), and so on. The energy scheduler component 514 can be in communication with end user and customer components 530. End user and customer components can include electrical equipment, manufacturing equipment, and so on. The end user and customer components can receive energy sent by the energy scheduler component. The energy scheduler component can receive data, information, parameters, metrics, etc., from the end user and customer components.

Figure 6:
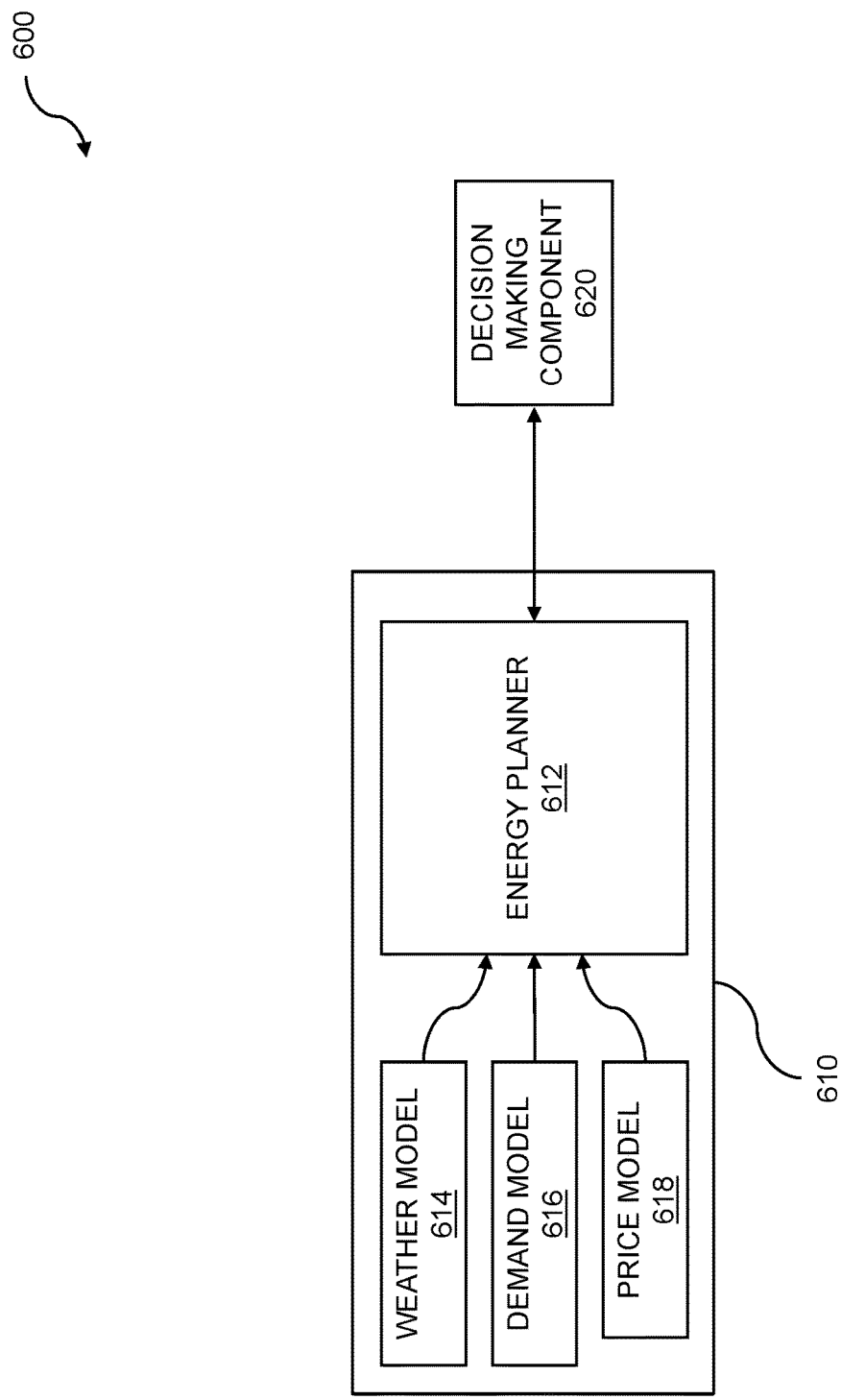
FIG. 6 is an example illustrating artificial intelligence (AI) and modeling components.

FIG. 6 is an example illustrating artificial intelligence (AI) and modeling component 600. Energy management with multiple pressurized storage elements can include an artificial intelligence and modeling component. The artificial intelligence (AI) and modeling component can adapt to energy needs by learning from past energy usage data, changes in energy usage due to seasonal factors, usage factors such as processing payroll or performing large engineering model simulations, and so on. Energy is obtained from one or more energy sources such as grid energy, locally generated energy, renewable energy, and so on. Energy requirements are modeled over a first time period and a second time period. The modeling can include predicted energy requirements, scheduled energy requirements, backup energy requirements, etc. A first subset of the energy that was obtained is allocated for storage in a first energy store based on the modeling. The energy stored in the first energy store can be allocated on a short-term basis. A second subset of the energy that was obtained is allocated for storage in a second energy store based on the modeling, where the second energy store comprises a pressurized storage element. The allocating energy for storage in the second energy store can be a long-term basis. Energy is routed to the first energy store from the second energy store based on the modeling. The routing further comprises transforming the first subset of energy into a first storable energy type, and transforming the second subset of energy into a second storable energy type. Energy is recovered using the energy routed to the first energy store or the second energy store, based on the modeling. Plan cycles can be iterated until a feasible solution is identified for providing energy end-to-end.

The FIG. 600 includes a modeling component 610. The modeling component includes an energy planner 612, where the energy planner can be used to plan and develop energy usage scenarios. The energy planner 612 can be part of an application programming interface (API), where the API can include planning, scheduling, controlling, routing, distribution, and other energy management components. The API can include energy demand management and energy demand control components. The energy planner can use plug-in models for the planning of obtaining energy, allocating energy, and so on. The plug-in models can be obtained by uploading by a user, downloading from the Internet, and so on. The plug-in models can include a weather model 614, a demand model 616, a price model 618, and other models useful for energy planning. The weather model 614 can include mathematical models which use contemporaneous oceanic data, atmospheric data, and weather condition data to forecast future weather conditions. Weather conditions can influence energy usage, such as energy use increases for heating, cooling, and lighting, energy use decreases on fair days, and so on. The demand model 616 can use data such as historical energy usage data to plan for increased energy availability based on seasonal energy usage, household energy usage, manufacturing energy usage, commercial energy usage, and so on. The price model 618 can plan energy usage based on the prices associated with various energy sources. The price model can include capturing and storing energy when the cost of producing the energy is low, then extracting the stored energy when energy prices are high. The FIG. 600 includes a decision-making component 620. The decision-making component can include an energy scheduler, and energy flow controller, a system health and operations metrics component, and so on. The decision-making component 620 can provide information to the energy planner 612 in order to plan for sourcing, allocating, and routing energy. The decision-making component can use information received from the energy planner including information based on weather modeling, demand modeling, price modeling, and so on, in order to approve various energy planning scenarios. In some embodiments, a blockchain arrangement can be used to manage information on energy obtained, stored, and retrieved. The blockchain can be used to manage a matrix of self-repeating units or a mesh network of nodes.

Figure 7A:
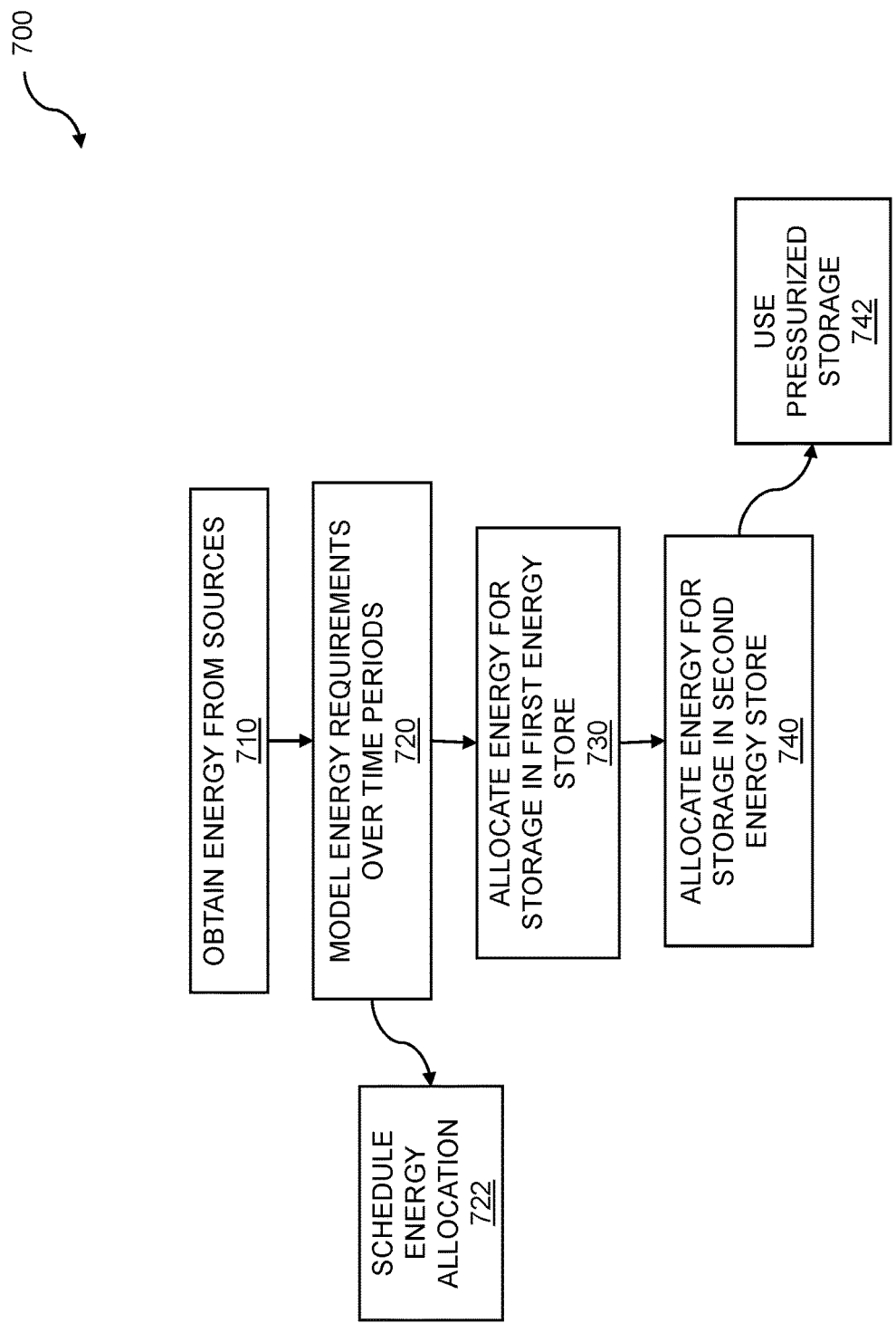
FIG. 7A is a flow diagram for energy allocation for storage.

FIG. 7A is a flow diagram for energy allocation for storage. Energy can be obtained from a variety of sources such as grid power, microgrid power, renewable power, and so on. The energy that is obtained can be stored on a short-term or long-term basis. The allocation of energy for storage supports energy management with multiple pressurized storage elements. Energy requirements are modeled over a first time period and a second time period, where the first time period can be a short-term basis, and the second time period can be a long-term basis. A first subset of the energy that was obtained is allocated for storage in a first energy store based on the modeling. A second subset of the energy that was obtained is allocated for storage in a second energy store based on the modeling, where the second energy store can include a pressurized storage element. Energy is routed to the first energy store from the second energy store based on the modeling. Energy is recovered using the energy routed to the first energy store or the second energy store, based on the modeling.

The flow 700 includes obtaining energy from one or more energy sources 710. The energy sources can include generated energy such as grid energy from coal, natural gas, hydro, nuclear, etc.; locally generated energy from micro-hydro, wood chips, geothermal, and the like; renewable energy such as solar, wind, waves, tidal, and so on. The flow 700 includes modeling energy requirements 720 over a first time period and a second time period. The energy requirements can be based on predicted energy requirements, scheduled power requirements, reserved power requirements, seasonal power requirements, backup or reserve power requirements, etc. In embodiments, the first time period is a short-term basis. The short-term basis can be an integer number of seconds, minutes, hours, or days, where the integer number of seconds, minutes, hours, or days comprises a length of time substantially less than one week. In other embodiments, the second time period is a long-term basis. The long-term basis can be an integer number of weeks, months, seasons, or years, where the integer number of weeks, months, seasons, or years comprises a length of time substantially more than one day. Short-term and long-term time periods can be managed by organizational or governmental requirements and regulations, energy usage policies, client requirements, and so on. In embodiments, the modeling includes scheduling energy allocation 722. The scheduling of energy allocation can be based on known peak periods of energy use, known customer requirements, service level agreements (SLA), and so on. In embodiments, the scheduling is based on energy usage patterns. The energy usage patterns can include manufacturing cycles, business operations cycles such as monthly billings, increased energy usage for cooling during warmer months or heating during colder months, etc. In embodiments, the scheduling can be based on energy demand, energy pricing, and energy storage. Scenarios for scheduling can include storing excess energy from generation, storing energy when energy generation costs are low, storing energy when energy stores are low, and so on.

The flow 700 includes allocating a first subset of the energy that was obtained for storage in a first energy store 730 based on the modeling. The first subset of energy can include some of the obtained energy or all of the obtained energy that was obtained for storage. As discussed below, the energy of the first subset of energy can include various energy types such as electrical energy, thermal energy, kinetic energy, potential energy, chemical energy, and so on. In embodiments, the energy store can include compressed air in an above ground tank, compressed air in an underwater bladder, steam in an above ground tank, steam in an underwater bladder or capsule, liquid nitrogen in an above ground tank, liquid nitrogen in an underground bladder or capsule, underground ice, and so on. The flow 700 includes allocating a second subset of the energy that was obtained for storage in a second energy store 740 based on the modeling, where the second energy store comprises a pressurized storage element. The second subset of energy can be stored using similar techniques to those used for storing the first subset of energy. The flow 700 includes using a pressurized storage element 742. As discussed throughout, the pressurized storage element can include a chamber or a bladder, where a bladder can include a capsule, an accordion-fold bag, and expandable bag, and so on. In embodiments, the obtaining, the modeling, the allocating the first subset, the allocating the second subset, and the routing comprise a fault-tolerant, scalable energy management system.

Figure 7B:
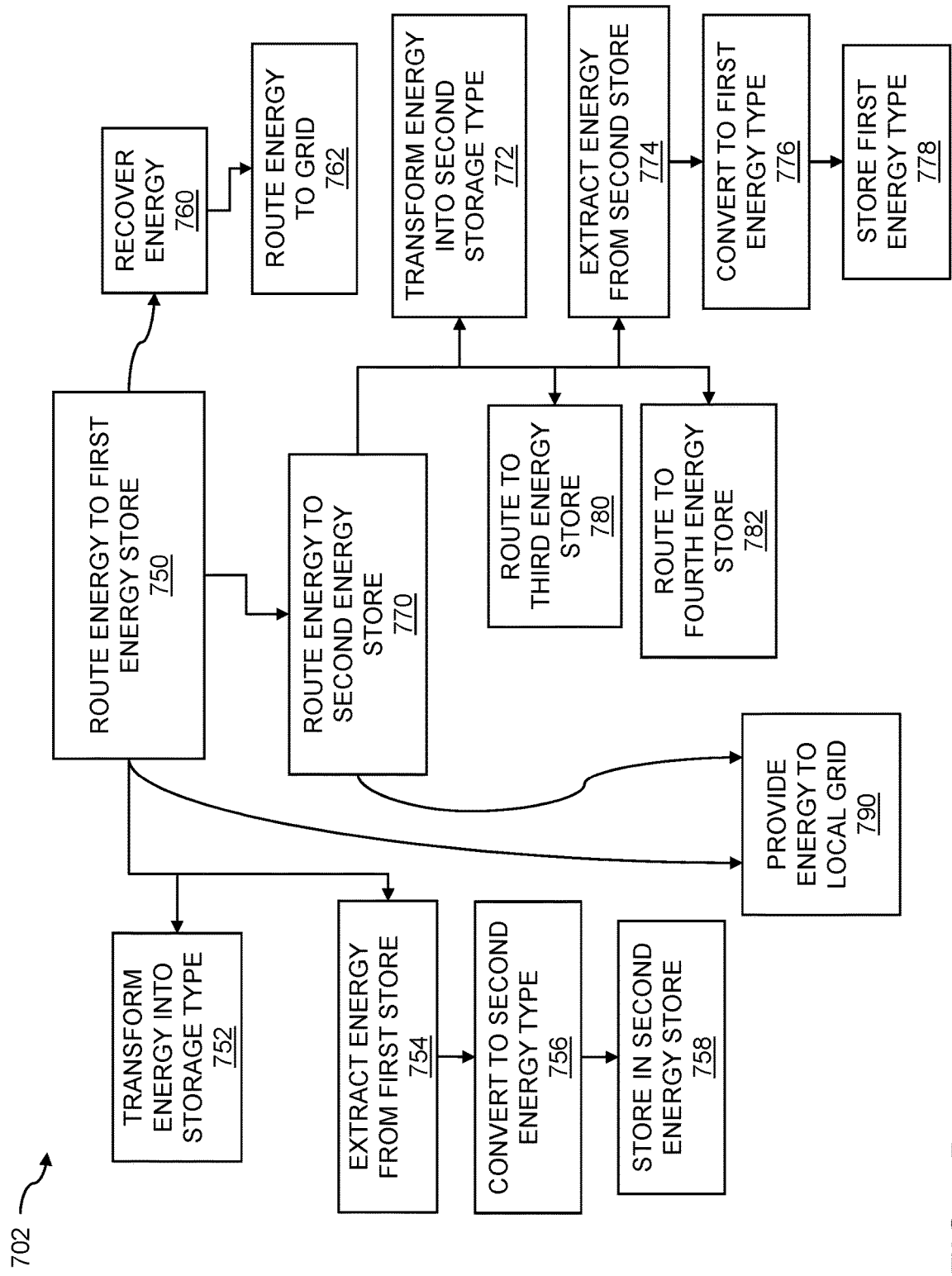
FIG. 7B is a flow diagram for energy management with multiple storage elements.

FIG. 7B is a flow diagram for energy management with multiple storage elements. As discussed throughout, energy management can include obtaining energy, modeling energy requirements, allocating energy for storage on a short-term basis or a long-term basis, routing energy from storage on a long-term basis to storage on a short-term basis, and recovering energy using energy routed to various energy stores. The energy management uses multiple pressurized storage elements. The flow 702 includes routing energy to the first energy store 750 from the second energy store based on the modeling. The routing can include storing electrical, thermal, potential, kinetic, or chemical energy when the electrical, thermal, potential, kinetic, or chemical energy can be stored directly to the storage medium or storage technique. In embodiments, the routing further comprises transforming the first subset of energy 752 into a first storable energy type. The transforming the first subset of energy can include transforming electrical energy into chemical energy in a battery for storage on a short-term basis. The short-term basis can be an integer number of seconds, minutes, hours, or days, wherein the integer number of seconds, minutes, hours, or days comprises a length of time substantially less than one week. In embodiments, the short-term basis can be less than 3.5 days and the long-term basis can be 3.5 days or more. In embodiments, the routing further comprises transforming the second subset of the energy into a second storable energy type. The transforming the second subset of energy can include converting electrical energy into compressed air or compressed gas, steam, liquid nitrogen, ice, ice-slurry, and so on. The converting the second subset of the energy can be performed on a long-term basis. The long-term basis can be an integer number of weeks, months, seasons, or years, wherein the integer number of weeks, months, seasons, or years comprises a length of time substantially more than one day.

Energy can be extracted after being stored either on a short-term basis or a long-term basis. In embodiments, the flow 702 further includes extracting energy from the first energy store 754, wherein the energy from the first energy store includes a first energy type. The first energy type can be electrical energy, thermal energy, kinetic energy, potential energy, chemical energy, and so on. The first energy type can be converted to another energy type. The first energy type can be converted in order to use the energy stored as the first energy type, to convert the energy to a long-term basis energy storage type, etc. In embodiments, the flow 702 further includes transforming the energy extracted from the first energy store into a second energy type 756. The conversion can include converting electrical, thermal, or kinetic energy, etc., into one of the other energy types. In embodiments, the flow 702 includes storing, in the second energy store 758, the energy extracted from the first energy store. The storing the second energy store can include compressed air, steam, liquid nitrogen, ice, ice-slurry, and so on. In embodiments, the energy store comprises storage of electrical energy in a battery, electrical energy in a capacitor, electrical energy in an inductor, thermal energy in above ground steam, potential kinetic energy in underwater compressed air, thermal and phase change energy in underground steam, thermal and phase change energy in above ground solid nitrogen, or thermal and phase change energy in underground liquid nitrogen and ice.

The flow 702 includes recovering energy 760 using the energy routed to the first energy store or the second energy store, based on the modeling. The recovering energy can include transforming energy from a stored energy type to another energy type such as electrical energy. The recovering energy can include discharging a battery or a capacitor, using compressed air, a compressed gas, or steam to spin a turbine, and the like. In embodiments, the recovering energy can be within an energy microgrid. An energy microgrid can include an onsite, local, or regional grid. The energy microgrid can include locally generated energy sources, renewable energy sources, etc. The flow 702 includes routing energy from the energy that was recovered, the energy routed to the first energy store, or the energy routed to the second energy store back to an energy grid 762 outside the energy microgrid. The energy grid can include a city-wide, statewide, regional, or national grid. In embodiments, the routing to the first energy store, the routing to the second energy store, the recovering, and the routing energy back to the energy grid can include a four-level network providing large scale energy storage.

The flow 702 includes routing energy to the second energy store 770 based on the allocating the second subset. As for the routing energy to the first energy store, the routing energy to the second energy store can include storing electrical, thermal, kinetic, or other energy when the energy type such as electrical, thermal, or kinetic energy can be stored directly to the storage medium or storage technique. The storage of energy within the second energy storage can be based on a variety of storage techniques. In embodiments, the second energy store can include compressed air within an underwater bladder. Air can be compressed or directed into an underwater bladder. The weight of the water above the bladder can be used to later expel the compressed air from the bladder. The routing of energy to the second energy store can further include routing energy to additional energy stores. The routing 770 further includes transforming the second subset of energy into a second storable energy type 772. The transforming the second subset of energy into a second storable energy type can include converting electrical energy into compressed air or compressed gas, steam, liquid nitrogen, and so on. Energy can be extracted after being stored on a short-term basis or a long-term basis. In embodiments, the routing further includes extracting energy from the second energy store 774, where the energy from the second energy store comprises a second energy type. The second energy type can include electrical energy, thermal energy, kinetic energy, mechanical energy, etc. In embodiments, the transforming can include transforming the energy extracted from the second energy store into the first energy type 776. In other embodiments, the transforming the second energy type can include transforming to an energy type other than the first energy type. The flow 700 can further include storing 778, in the first energy store, the energy extracted from the second energy store. As for storing in the second energy store, the storing in the first energy store can include compressed air, steam, liquid nitrogen, ice, etc.

As stated previously, in embodiments, the second energy store further includes a third energy store. In the flow 702, some or all of the energy that is routed to the second energy store can be routed to the third energy store 780. The third energy store can include compressed air within an underwater bladder. The underwater bladder can include a capsule, an accordion-fold bag, an expandable bag, a chamber, an unused oil well infrastructure, and so on. In other embodiments, the third energy store further includes steam within an underwater bladder. The pressure of the water above the underwater bladder can be used to pressurize the steam. In embodiments, the second energy store further includes a fourth energy store. As with the third energy store, some or all of the energy that is routed to the second energy store can be routed to the fourth energy store 782. In embodiments, the fourth energy store comprises underground liquid nitrogen, solid nitrogen, or ice storage. In other embodiments, the fourth energy store can include compressed air, steam, and so on. In the flow 702, the routing further includes providing energy to a local energy grid 790. The energy that is provided to the local energy grid can be excess energy from renewable energy sources, unused energy from a power grid, excess locally generated energy, etc., that was stored on a short-term basis or a long-term basis. The energy provided to a local energy grid can be provided via net metering or another power provision agreement. Various steps in the flows 700 and 702 may be changed in order, repeated, omitted, or the like without departing from the disclosed concepts. Various embodiments of the flows 700 and 702 can be included in a computer program product embodied in a non-transitory computer readable medium that includes code executable by one or more processors.

FIG. 8 is a table illustrating example core energy modules. Core energy modules can include a diversity of energy types, and a range of energy storage and generation techniques, for energy management with multiple pressurized storage elements. Energy is obtained from one or more energy sources such as grid energy, locally generated energy, microgrid power, renewable energy, and so on. Energy requirements are modeled over a first time period and a second time period. The modeling can include predicted energy requirements, scheduled energy requirements, backup energy requirements, seasonal energy requirements, etc. A first subset of the energy that was obtained is allocated for storage in a first energy store based on the modeling. The energy that is stored in the first energy store can be allocated on a short-term basis. A second subset of the energy that was obtained is allocated for storage in a second energy store based on the modeling, where the second energy store comprises a pressurized storage element. The energy that is stored in the second energy store can be allocated on a long-term basis. Energy is routed to the first energy store from the second energy store based on the modeling. The routing further comprises transforming the first subset of energy into a first storable energy type, and transforming the second subset of energy into a second storable energy type. Energy recovery uses the energy routed to the first energy store or the second energy store, based on the modeling A table 800 illustrating example core energy modules is shown. Various forms of energy, such as electrical energy, kinetic energy, potential energy, thermal energy, chemical energy, etc., can be generated, stored on a short-term basis, stored on a long-term basis, and so on. Energy such as electrical energy can be stored for the short term in a battery or capacitor, and stored for the long term as underwater compressed air. The electrical energy can be used to power a motor-compressor set, a pump-turbine set, etc., to compress the air. Electrical energy can be generated using a diesel-generator (DG) set, a motor-generator, a generator powered by compressed air or other compressed gas, and so on. Thermal energy, such as the thermal energy contained in steam, can be stored short-term as above ground steam, and stored long-term as underground steam. Steam can be generated using a heat engine. Other forms of thermal energy can include ice, ice-slurry, solid nitrogen ($N_2$), etc. Ice and $N_2$, for example, can be stored short-term as aboveground ice or solid $N_2$, and underground as ice or solid $N_2$. Ice and $N_2$ can be generated with a heat engine, or using other techniques. In embodiments, the energy store comprises storage of electrical energy in a battery, electrical energy in a capacitor, electrical energy in an inductor, thermal energy in above ground steam, potential kinetic energy in underwater compressed air, thermal and phase change energy in underground steam, thermal and phase change energy in above ground solid nitrogen, or thermal and phase change energy in underground liquid nitrogen and ice.

The table 800 illustrates energy management within a microgrid (short-term storage, energy generation, and long-term storage) but connected to a grid outside of the microgrid (traditional power grid, renewable energy grid, or seasonal energy grid). Energy can be sourced from a source, or grid, outside of the microgrid and delivered to a sink, or grid, outside of the microgrid. A microgrid can be delineated by local wiring and control, such as for a "smart home" running its own solar array, as well as by a logical interconnection of energy sources, sinks, and conversions, such as for an ad hoc network of physically or logically connected elements. The so called "smart home" can be connected to a traditional power grid and can even resell generated solar energy to the traditional grid in a conventional fashion without being a microgrid energy management system as described herein.

Figure 9:
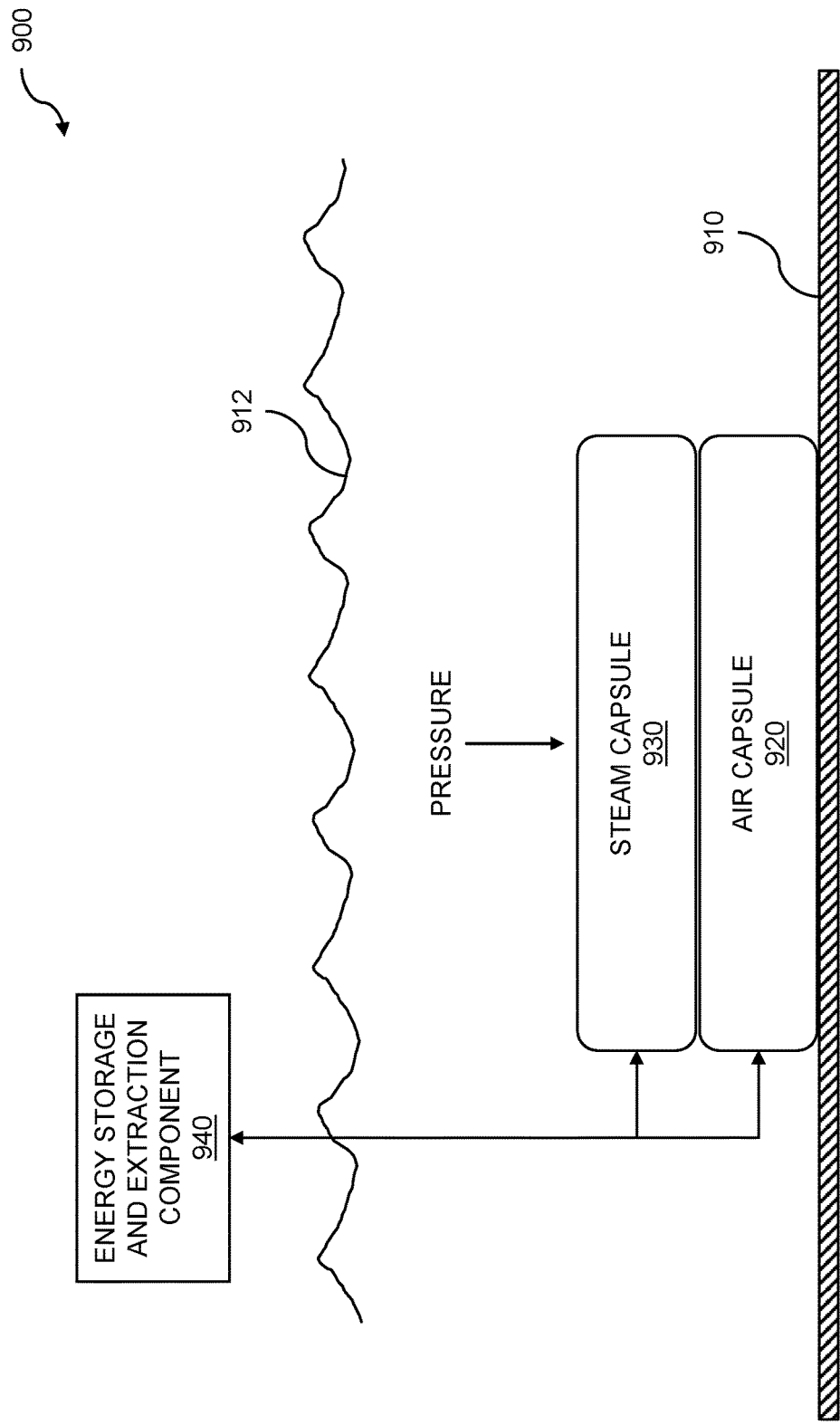
FIG. 9 explains energy storage using steam and compressed air.

FIG. 9 is an example showing energy storage using steam and compressed air. Energy storage and extraction can be based on energy management with multiple pressurized storage elements. The energy storage can include a period of time, where the period of time can be determined on a short-term basis or on a long-term basis. Energy is obtained from one or more energy sources. Energy requirements are modeled over a first time period and a second time period. The first time period can be a short-term basis, and the second time period can be a long-term basis. A first subset of the energy that was obtained is allocated for storage in a first energy store based on the modeling. A second subset of the energy that was obtained is allocated for storage in a second energy store based on the modeling, where the second energy store comprises a pressurized storage element. Energy is routed to the first energy store from the second energy store based on the modeling. Energy is recovered using the energy routed to the first energy store or the second energy store, based on the modeling.

Energy can be stored in chambers, capsules, tanks, bladders, and so on. The chambers, capsules, tanks, bladders, etc., can be placed above ground or underground, floating in water such as fresh, brackish, or salt water, or underwater as shown 900. Capsules can be mounted on a seabed 910, lakebed, pond bed, river bed, or other underwater location 912. The capsules can be pressurized by the weight of the water, or hydraulic head, above the capsules in the underwater location 912. In 900, two example capsules are shown, an air capsule 920 and a steam capsule 930. While two capsules 920 and 930 are shown, other numbers of capsules can be included. The capsules can include other pressurized gases such as oxygen or nitrogen. In embodiments, the second energy store comprises compressed air within an underwater bladder air capsule 920. The capsules, bladders, accordion-fold bags, etc. can include a first energy store, a second energy store, a third energy store, a fourth energy store, and so on. An energy store can include more than one energy store. In embodiments, the second energy store can further include a third energy store. The third energy store can use the same energy storage technique as the second energy store, or can use a different energy storage technique. In embodiments, the third energy store can include compressed air within an underwater bladder, while in other embodiments, the third energy store can further include steam within an underwater bladder. Energy storage and extraction can be controlled by an energy storage and extraction component 940. While the energy storage and extraction component 940 is shown above water 912, the energy storage and extraction component can be located above water, below water, distributed above water and below water, on a floating or partially submerged platform, on land, and so on. The energy storage and extraction component can include one or more processors which can control energy storage and extraction.

Figure 10:
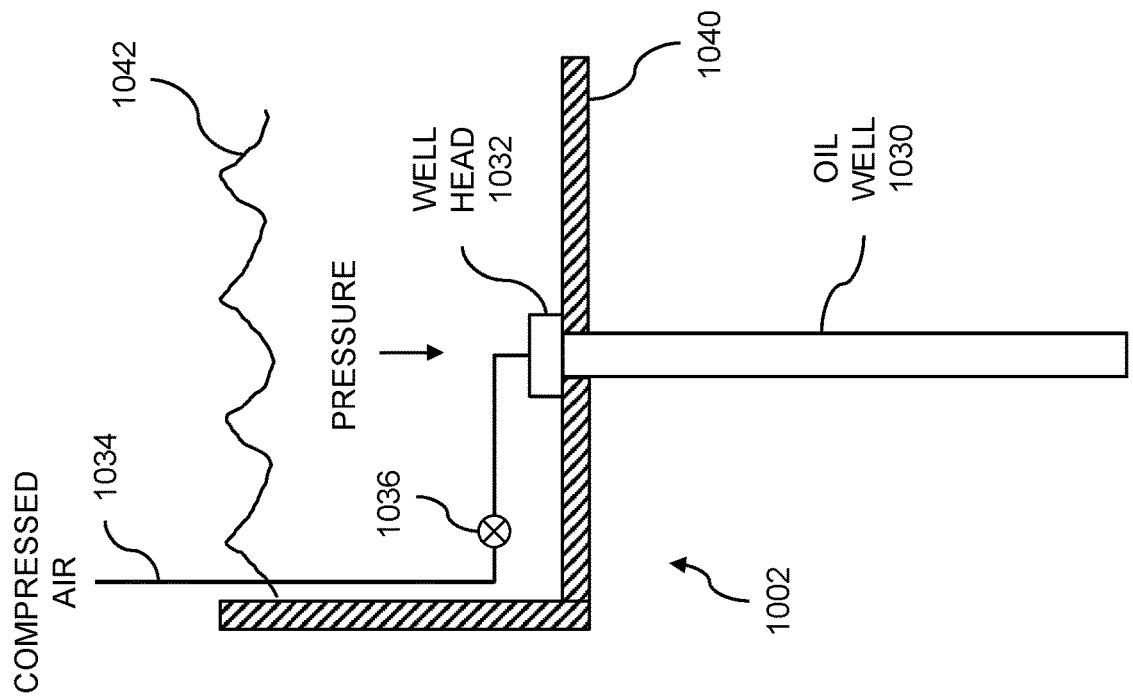
FIG. 10 illustrates underwater pressurized-air storage.
Figure 10:
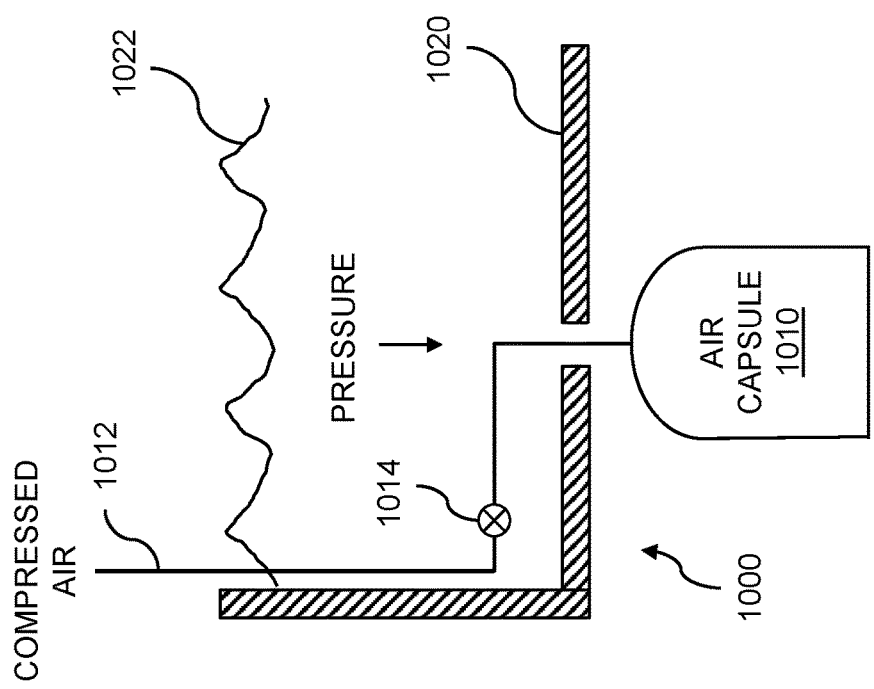

FIG. 10 illustrates underwater pressurized-air storage. A pressurized gas such as air, oxygen, nitrogen, carbon-dioxide, and so on, can be used by a storage subsystem of an energy storage management system. The pressurized-air storage can support energy storage and management with multiple pressurized storage elements. Various types of storage elements or vessels can be used to store a pressurized gas. Storage techniques such as pressurized bladders, pressurized accordion-fold bags, expandable bags or balloons, expandable containers, and so on, can be used. Pressurized-air storage can also be accomplished using a rigid structure such as a vessel, where the vessel can be implemented using a variety of geometric shapes. An example vessel comprising an air capsule 1010 is shown for pressurized-air storage 1000. The air capsule can be located at the bottom of a body of water, where the body of water can include freshwater, brackish water, or saltwater. The air capsule can be located on a lakebed or seabed 1020, at the bottom of a river, and so on. The air capsule can be located beneath the lakebed or seabed. The height of the water above the air capsule can be determined by the difference between the surface 1022 of the body of water and the lakebed or seabed 1020. The pressure created by that water depth or hydraulic head may be used to pressurize the air capsule, depending on the structure of the air capsule (e.g. rigid, flexible, expandable, etc.). The air capsule can be accessed by a feedline or pipe 1012 and a valve 1014. The pipe and valve can be used by a pump or compressor to provide compressed air or another compressed gas to the air capsule.

A second structure for underwater pressurized-air storage 1002 is shown. Energy management and storage can be accomplished with multiple pressurized storage elements. The pressurized storage elements can be implemented within a non-productive oil well infrastructure. A non-productive oil well 1030 and well head 1032 can be used as a vessel for storage of the pressurized-air, oxygen, nitrogen, carbon dioxide, or other gas. Again, a depth of water above the well head can be determined by computing the distance between the surface of the body of water 1042 and the bed of the body of water 1040. The height of water or hydraulic head can exert pressure on the well head of the oil well. The water pressure may be used to exert pressure on the oil well for pressurized-air storage. Pressurized-air or another gas can be stored in the non-productive oil well infrastructure using a feedline or pipe 1034 and valve 1036. The pressurized-air or other gas can be pumped into the oil well and later removed from the oil well to be used for energy recovery. Energy recovery can include heat exchange, spinning a turbine, and so on.

Figure 11:
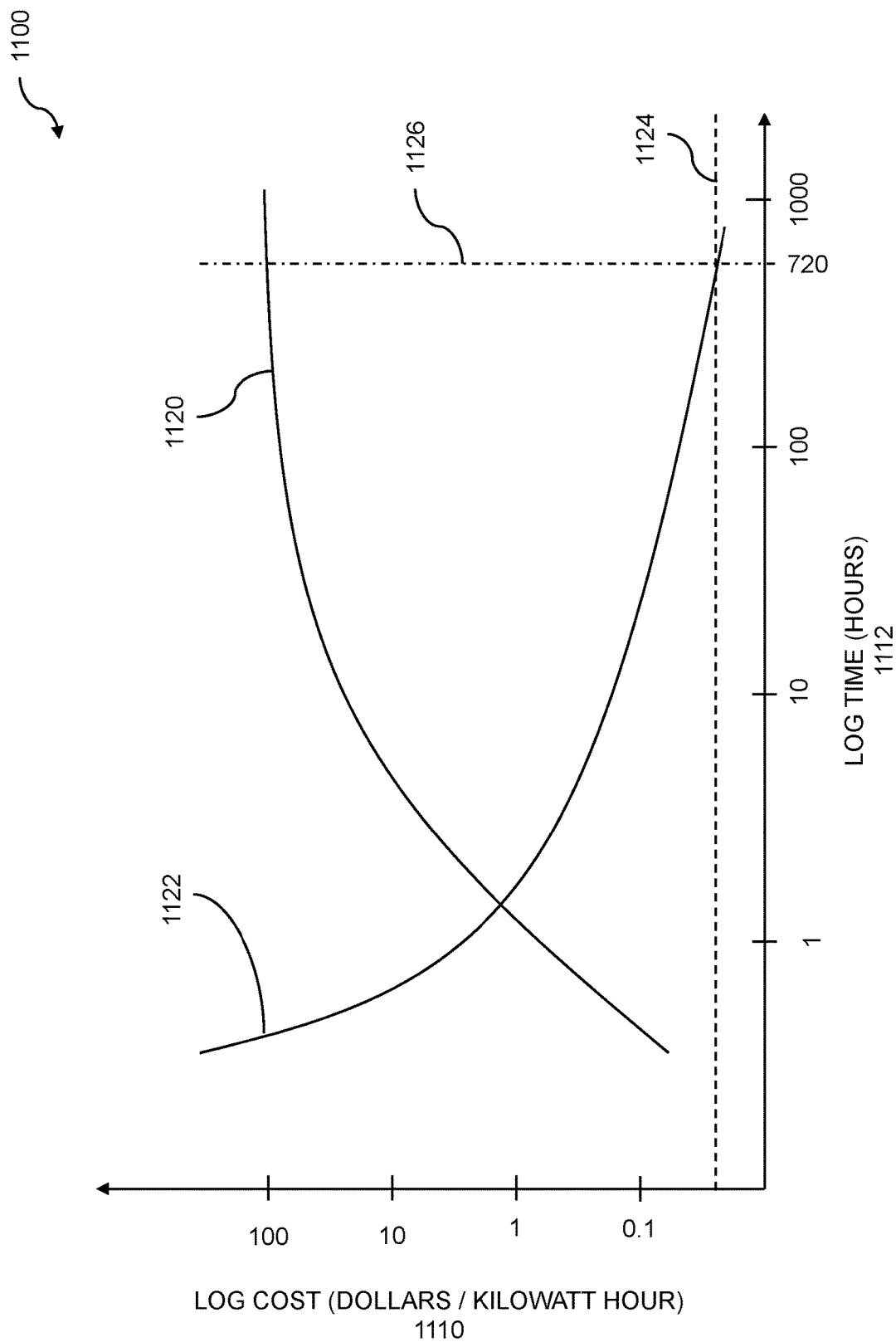
FIG. 11 shows energy cost over time for short-term versus long-term storage.

FIG. 11 shows energy cost over time for short-term versus long-term storage. The costs of obtaining energy, allocating energy for storage, routing energy, or retrieving energy significantly influence energy management with multiple pressurized storage elements. Energy is obtained from one or more energy sources such as an energy grid, and energy microgrid, locally generated energy, alternative energy, and so on. Energy requirements are modeled over a first time period and a second time period. The first time period can be a short-term basis, and the second time period can be a long-term basis. A first subset of the energy that was obtained is allocated for storage in a first energy store based on the modeling. The first energy store can include batteries, capacitors, or the like. A second subset of the energy that was obtained for storage is allocated in a second energy store based on the modeling. The second energy store can include a pressurized storage element such as a canister, chamber, or bladder. Energy is routed to the first energy store from the second energy store based on the modeling. The routing can include converting energy from one energy type to another energy type. Energy is recovered using the energy routed to the first energy store or the second energy store, based on the modeling.

The costs of energy storage for a short-term basis or a long-term basis vary over time. A graph 1100 is shown that plots logarithm of cost in dollars per kilowatt hour 1110 ($/kWh) versus logarithm time in hours 1112 (h). While the units of currency shown are illustrative and include dollars, other units of currency can be used including Euros, Pounds, Yuan, Brazilian Real, Rupee, Ruble, or other currency. Similarly, while the units of time shown include hours, other units of time can be used including seconds, days, weeks, months, annual quarters, seasons, years, etc.

A curve 1120 for energy storage based on traditional techniques is shown, where for a short-term basis, the storage can have a very low cost. The short-term basis storage can include electrical energy storage, chemical energy storage, and so on. Techniques for the short-term basis storage can include capacitors, lead-acid batteries or other batteries, etc. The short-term basis storage can be used effectively for providing energy when energy from sources such as grid power or microgrid power cannot meet a short peak in demand, when there is a short power outage lasting for seconds or minutes, and so on. While short-term basis energy storage can be quite effective for meeting short-term energy needs, the costs of energy storage based on the short-term techniques including capacitors, batteries, and the like, can become prohibitive if such energy storage techniques are used to provide sufficient energy to meet energy demands that can last hours, days, weeks, months, etc. A curve for energy storage based on pressurized storage element techniques is shown 1122. Energy storage based on pressurized storage elements can be quite expensive for short-term basis storage due to costs of energy conversion, allocation, routing, and recovery techniques that support the pressurized storage elements. The long-term basis storage can be used effectively for providing low-cost energy for long-term energy demand such as hours, days, weeks, months, seasons, years, and so on.

In a usage example, energy such as electrical energy can be obtained from sources such as a power grid, a microgrid, locally generated power, renewable power, and so on. The obtained energy can be allocated to short-term basis storage or long-term basis storage using models, where the models can be based on power usage patterns, cost of the energy, cost of energy storage, and so on. In the usage example, power needs require that power be available for 720 hours 1126 at a cost of $0.04 per kilowatt hour 1124. By examining the curves 1120 and 1122, one sees that the cost of stored energy based on capacitors or batteries is approximately $100 per kilowatt hour, while the cost of stored energy based on pressurized storage elements is approximately the target cost of $0.04 per kilowatt hour.

Figure 12:
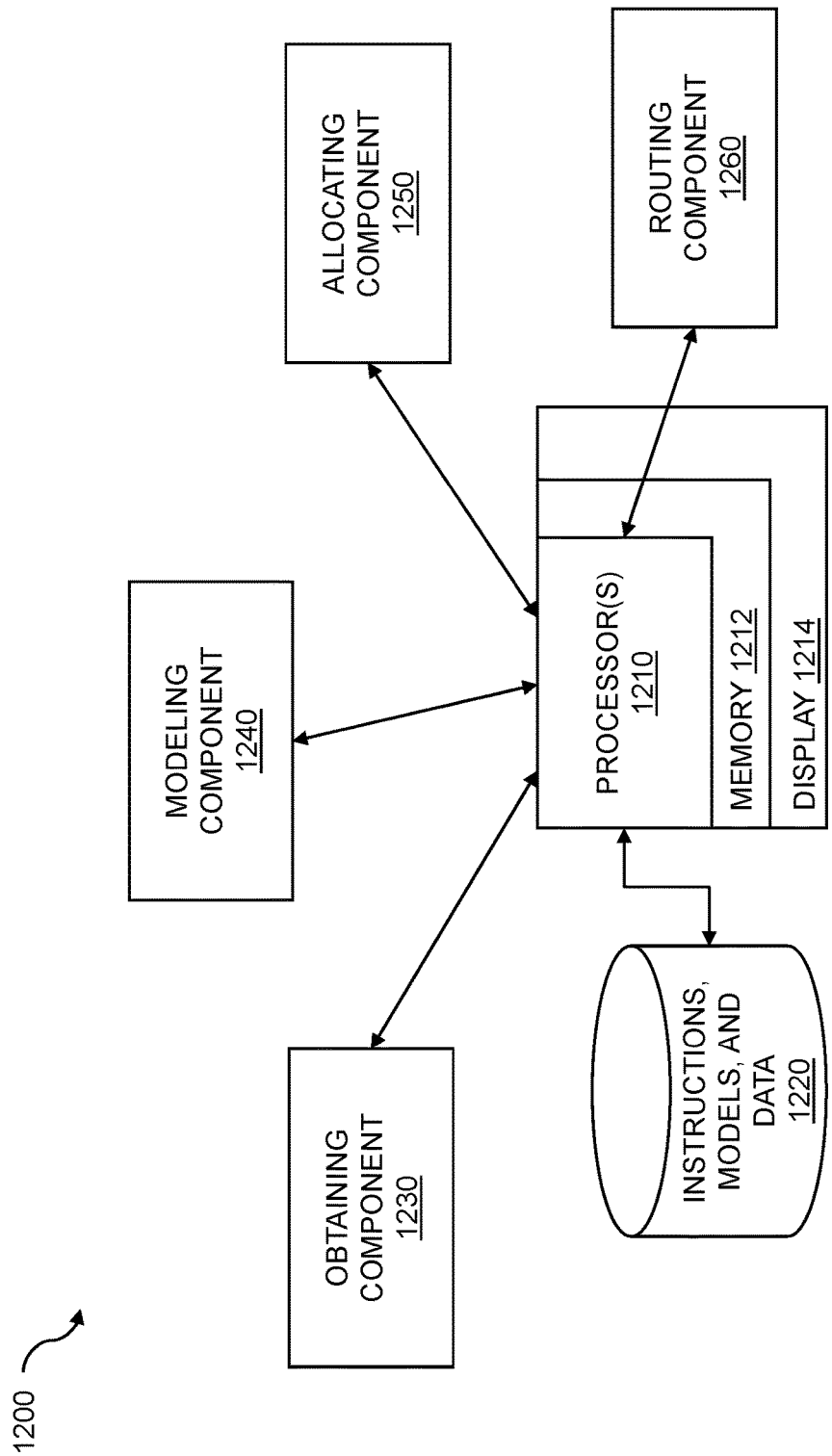
FIG. 12 shows a system diagram for management and control.

FIG. 12 shows a system diagram for management and control. Energy is obtained from one or more energy sources. The energy sources can include commercially generated energy, locally or on-site generated energy, renewable energy, stored energy, etc. Energy requirements are modeled over a first time period and a second time period. The time period can be a short-term basis, where a short-term basis can include an integer number of seconds, minutes, or days, substantially less than a week, and so on. The time period can be a long-term basis, where a long-term basis can include an integer number of weeks, months, seasons, or years, where the integer number of weeks, months, seasons, or years, including a length of time that can be substantially more than one day. A first subset of the energy that was obtained is allocated for storage in a first energy store based on the modeling. A second subset of the energy that was obtained is allocated for storage in a second energy store based on the modeling, where the second energy store includes a pressurized storage element. An energy store can store energy including various energy types. An energy store can include compressed air, steam, liquid nitrogen, ice, an ice slurry, and so on. Energy is routed to the first energy store from the second energy store based on the modeling. Energy is recovered using the energy routed to the first energy store or the second energy store, based on the modeling. The recovering energy is within an energy microgrid.

The system 1200 can include one or more processors 1210 and a memory 1212 which stores instructions. The memory 1212 is coupled to the one or more processors 1210, wherein the one or more processors 1210 can execute instructions stored in the memory 1212. The memory 1212 can be used for storing instructions, for storing databases of power sources, for storing models of energy requirements, for storing energy allocations, for system support, and the like. The one or more processors, when executing the instructions which are stored, are configured to: obtain energy from one or more energy sources; model energy requirements over a first time period and a second time period; allocate a first subset of the energy that was obtained for storage in a first energy store based on the modeling; allocate a second subset of the energy that was obtained for storage in a second energy store based on the modeling, wherein the second energy store comprises a pressurized storage element; and route energy to the first energy store from the second energy store based on the modeling. Information regarding energy management with multiple pressurized storage elements can be shown on a display 1214 connected to the one or more processors 1210. The display can comprise a television monitor, a projector, a computer monitor (including a laptop screen, a tablet screen, a netbook screen, and the like), a smartphone display, a mobile device, or another electronic display.

The system 1200 includes instructions, models, and data 1220. In embodiments, the instructions, models, and data 1220 are stored in a networked database, where the networked database can be a local database, a remote database, a distributed database, and so on. The instructions, models, and data 1220 can include instructions for obtaining energy from one or more energy sources, models for energy requirements including a variety of energy requirement scenarios, instructions for allocating a subset of energy, instructions for routing energy, etc. The system 1200 includes an obtaining component 1230. The obtaining component 1230 can obtain energy from one or more energy sources, where the energy sources can include grid energy, renewable energy, locally generated energy, stored energy, and so on. The system 1200 includes modeling component 1240. The modeling component 1240 can be used for modeling energy requirements over time periods such as a first time period and a second time period. The time periods can be determined on a short-term basis or a long-term basis. A short-term basis can be an integer number of seconds, minutes, hours, or days, wherein the integer number of seconds, minutes, hours, or days comprises a length of time substantially less than one week. A long-term basis can be an integer number of weeks, months, seasons, or years, wherein the integer number of weeks, months, seasons, or years comprises a length of time substantially more than one day.

The system 1200 includes an allocating component 1250. The allocating component 1250 can allocate a first subset of the energy that was obtained for storage in a first energy store based on the modeling. The allocating component can allocate a second subset of the energy that was obtained for storage in a second energy store based on the modeling, where the second energy store comprises a pressurized storage element. The energy in the energy stores can include various energy types. The energy types can include electrical energy, kinetic energy, thermal energy, potential energy, chemical energy, and the like. Energy can be stored in, routed to, and extracted from an energy store. An energy store can include compressed air, steam, liquid nitrogen, ice, an ice slurry, etc. The system 1200 includes a routing component 1260. Energy can be routed to the first energy store from the second energy store based on the modeling. The routing can include transforming the first subset of energy into a first storable energy type. The transforming energy can include transforming electrical current into compressed air, steam, solid nitrogen, liquid nitrogen, ice, and the like.

Disclosed embodiments can include a computer program product embodied in a non-transitory computer readable medium for energy management, the computer program product comprising code which causes one or more processors to perform operations of: obtaining energy from one or more energy sources; modeling energy requirements over a first time period and a second time period; allocating a first subset of the energy that was obtained for storage in a first energy store based on the modeling; allocating a second subset of the energy that was obtained for storage in a second energy store based on the modeling, wherein the second energy store comprises a pressurized storage element; and routing energy to the first energy store from the second energy store based on the modeling.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method for energy storage management comprising:
   obtaining energy from one or more energy sources;
   modeling energy demand and energy pricing over a first time period and a second time period, wherein the first period is a short-term basis and the second period is a long-term basis;
   allocating a first subset of the energy that was obtained for storage in a first energy store based on the modeling of energy demand and energy pricing;
   allocating a second subset of the energy that was obtained for storage in a second energy store based on the modeling of energy demand and energy pricing, wherein the second energy store comprises a pressurized storage element; and
   routing energy to the first energy store from the second energy store based on the modeling of energy demand and energy pricing.

2. The method of claim 1 further comprising recovering energy using the energy routed to the first energy store or the second energy store, based on the modeling.

3. The method of claim 2 wherein the recovering energy is within an energy grid.

4. The method of claim 3 further comprising routing energy from the energy that was recovered, the energy routed to the first energy store, or the energy routed to the second energy store back to an energy grid outside the energy grid.

5. The method of claim 4 wherein the routing to the first energy store, the routing to the second energy store, the recovering, and the routing energy back to the energy grid comprise a four-level network providing large scale energy storage.

6. The method of claim 1 wherein the routing further comprises transforming the first subset of the energy into a first storable energy type.

7. The method of claim 6 wherein the routing further comprises transforming the second subset of the energy into a second storable energy type.

8. The method of claim 1 wherein the short-term basis is an integer number of seconds, minutes, hours, or days, wherein the integer number of seconds, minutes, hours, or days comprises a length of time substantially less than one week.

9. The method of claim 1 wherein the long-term basis is an integer number of weeks, months, seasons, or years, wherein the integer number of weeks, months, seasons, or years comprises a length of time substantially more than one day.

10. The method of claim 1 further comprising extracting energy from the first energy store, wherein the energy from the first energy store comprises a first energy type.

11. The method of claim 10 further comprising transforming the energy extracted from the first energy store into a second energy type.

12. The method of claim 11 further comprising storing, in the second energy store, the energy extracted from the first energy store.

13. The method of claim 10 further comprising extracting energy from the second energy store, wherein the energy from the second energy store comprises a second energy type.

14. The method of claim 13 further comprising transforming the energy extracted from the second energy store into the first energy type.

15. The method of claim 14 further comprising storing, in the first energy store, the energy extracted from the second energy store.

16. The method of claim 1 wherein the second energy store comprises compressed air within an underwater bladder.

17. The method of claim 16 wherein the second energy store further comprises a third energy store.

18. The method of claim 1 wherein the routing further comprises providing energy to a local energy grid.

19. The method of claim 1 wherein the first energy store comprises storage of electrical energy in a battery, electrical energy in a capacitor, electrical energy in an inductor, thermal energy in above ground steam, potential kinetic energy in underwater compressed air, thermal and phase change energy in underground steam, thermal and phase change energy in above ground solid nitrogen, or thermal and phase change energy in underground liquid nitrogen and ice.

20. The method of claim 1 wherein modeling includes scheduling energy allocation.

21. The method of claim 20 wherein the scheduling is based on energy usage patterns.

22. The method of claim 20 wherein the scheduling is based on energy demand, energy pricing, and energy storage.

23. The method of claim 1 wherein the obtaining, the modeling, the allocating the first subset, the allocating the second subset, and the routing comprise a fault-tolerant, scalable energy management system.

24. The method of claim 1 wherein the second energy store comprises compressed air within a non-productive oil well infrastructure.

25. A computer program product embodied in a non-transitory computer readable medium for energy management, the computer program product comprising code which causes one or more processors to perform operations of:
   obtaining energy from one or more energy sources;
   modeling energy demand and energy pricing over a first time period and a second time period, wherein the first period is a short-term basis and the second period is a long-term basis;
   allocating a first subset of the energy that was obtained for storage in a first energy store based on the modeling of energy demand and energy pricing;
   allocating a second subset of the energy that was obtained for storage in a second energy store based on the modeling of energy demand and energy pricing, wherein the second energy store comprises a pressurized storage element; and
   routing energy to the first energy store from the second energy store based on the modeling of energy demand and energy pricing.

26. A computer system for energy management comprising:
   a memory which stores instructions;
   one or more processors attached to the memory wherein the one or more processors, when executing the instructions which are stored, are configured to:
      obtain energy from one or more energy sources;
      model energy demand and energy pricing over a first time period and a second time period, wherein the first period is a short-term basis and the second period is a long-term basis;
      allocate a first subset of the energy that was obtained for storage in a first energy store based on the modeling of energy demand and energy pricing;
      allocate a second subset of the energy that was obtained for storage in a second energy store based on the modeling of energy demand and energy pricing, wherein the second energy store comprises a pressurized storage element; and
      route energy to the first energy store from the second energy store based on the modeling of energy demand and energy pricing.

* * * * *